United States Patent
Gerstenberger et al.

(10) Patent No.: US 10,716,116 B2
(45) Date of Patent: Jul. 14, 2020

(54) METHOD AND DEVICE FOR DETERMINING A NUMBER OF MIMO LAYERS

(71) Applicant: Telefonaktiebolaget LM Ericsson (publ), Stockholm (SE)

(72) Inventors: Dirk Gerstenberger, Stockholm (SE); Daniel Larsson, Solna (SE); Kai-Erik Sunell, Bromma (SE); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/493,406

(22) Filed: Apr. 21, 2017

(65) Prior Publication Data
US 2017/0238300 A1    Aug. 17, 2017

Related U.S. Application Data

(60) Continuation of application No. 14/476,055, filed on Sep. 3, 2014, now Pat. No. 9,655,125, which is a
(Continued)

(51) Int. Cl.
*H04W 72/04* (2009.01)
*H04B 7/0413* (2017.01)
(Continued)

(52) U.S. Cl.
CPC ........ *H04W 72/048* (2013.01); *H04B 7/0413* (2013.01); *H04W 72/042* (2013.01);
(Continued)

(58) Field of Classification Search
None
See application file for complete search history.

(56) References Cited

U.S. PATENT DOCUMENTS

| 2003/0206524 A1 | 11/2003 | Mohanty et al. |
| 2009/0135965 A1 | 5/2009 | Shen et al. |

(Continued)

FOREIGN PATENT DOCUMENTS

| JP | 2012 39601 | 2/2012 |
| WO | 2010147882 A2 | 10/2010 |

OTHER PUBLICATIONS

Notice of Ground for Rejection issued for Patent Application No. 2014-505104—dated Jul. 31, 2015.
(Continued)

*Primary Examiner* — Hong S Cho
(74) *Attorney, Agent, or Firm* — Baker Botts, LLP

(57) ABSTRACT

The embodiments herein relate to a method in a base station (603) for communicating with a user equipment (605) in the communication network (600). The base station (603) is configured to communicate with the user equipment (605) according to a selectable of at least two user equipment categories. Based on information about a selected user equipment category, the base station (603) determines a first number of maximum transmission layers supported by the base station (603). The base station (603) communicates with the user equipment (605) according to up to the determined first number of maximum transmission layers and according to the selected user equipment category.

14 Claims, 15 Drawing Sheets

Related U.S. Application Data division of application No. 13/375,848, filed as application No. PCT/SE2011/051228 on Oct. 14, 2011, now Pat. No. 8,855,624.

(60) Provisional application No. 61/474,938, filed on Apr. 13, 2011.

(51) Int. Cl.
  *H04W 88/10* (2009.01)
  *H04W 88/06* (2009.01)
(52) U.S. Cl.
  CPC ........ *H04W 72/0406* (2013.01); *H04W 88/06* (2013.01); *H04W 88/10* (2013.01)

(56) References Cited

U.S. PATENT DOCUMENTS

| | | | |
|---|---|---|---|
| 2009/0232050 A1 | 9/2009 | Shen et al. | |
| 2010/0050034 A1* | 2/2010 | Che | H04L 1/1845 714/748 |
| 2010/0322351 A1* | 12/2010 | Tang | H04B 7/024 375/316 |
| 2011/0013506 A1* | 1/2011 | Ishii | H04W 72/1242 370/208 |
| 2011/0081934 A1* | 4/2011 | Imamura | H04W 52/146 455/522 |
| 2011/0199921 A1 | 8/2011 | Damnjanovic et al. | |
| 2011/0249602 A1* | 10/2011 | Wennstrom | H04L 1/0041 370/310 |
| 2011/0305161 A1 | 12/2011 | Ekpenyong et al. | |
| 2012/0026948 A1 | 2/2012 | Ogawa et al. | |
| 2012/0113831 A1 | 5/2012 | Pelletier et al. | |
| 2012/0178439 A1 | 7/2012 | Vashi et al. | |
| 2012/0322455 A1 | 12/2012 | Oh | |
| 2013/0051490 A1 | 2/2013 | Gupta et al. | |
| 2013/0095816 A1 | 4/2013 | Gerstenberger et al. | |
| 2013/0176981 A1 | 7/2013 | Earnshaw et al. | |

OTHER PUBLICATIONS

3GPP TSG RAN WG1 Meeting #62; Madrid, Spain; Title: LS on Rel-10 UE category; Source: RAN WG1 (R1-105095)—Aug. 23-27, 2010.
Russian Office Action issued for Application No. 2013 150253 filed Oct. 14, 2011—dated Oct. 12, 2015.
International Search Report and Written Opinion dated Feb. 27, 2012 in corresponding PCT/SE2011/051228—dated Feb. 27, 2012.
3GPP; Technical Specification Group Radio Access Network; E-UTRA; UE Radio Access Capabilities (Release 10); 3GPP TS 36.306 No. v10.1.0—Mar. 2011.
Nokia Siemens Networks et al.; "UE Capability Signalling for CA and MIMO in RELlO", 3GPP Draft; R2-106892 UE Capability Signaling for CA and MIMO in RELlO. vol. RAN WG2, Nov. 15, 2010, Nov. 19, 2010, XP050492565, Chapter 2.1.3. MIMO Capabilities.
Verizon et al.; "Discussion on Rel-10 UE Category and CA/MIMO Signaling", 3GPP Draft; R2-110951, vol. RAN WG2, Feb. 21, 2011, Feb. 14, 2011, XP050493545, Chapter 2.1.1.
RAN WG1; "LS on Rel-10 UE Category", 3GPP Draft; R1-105095 LS on REL-10 UE Category, vol. RAN WG1, Aug. 29, 2010, XP050489282, Chapter 2. Proposal on UE Category for Rel-10 Time Frame.
Research in Motion UK Limited: "Clarification of Rel-10 UE Category and MIMO Layer Capability Definition", 3GPP Draft; R2-110224 Clarification of UE Category and MIMO Layer Capability, vol. RAN WG2; Jan. 17, 2011, Jan. 11, 2011, XP050492935, Chapter 2.2 Explicit Signalling in MIMO Layer Capability.
Research in Motion UK Limited: "Discussion on UE Categories and Capabilities", R4-112139, vol. RAN WG4, Apr. 11, 2011, Apr. 6, 2011, XP050502101.
Huawei et al.: "UE Capabilities for MIMO", 3GPP Draft; R1-110521 UE Capabilities for MIMO, Jan. 17, 2011, Jan. 20, 2011, XP050490406, Chapter 2 Proposal for MIMO-related UE capabilities.
U.S. Appl. No. 13/393,952, filed Mar. 2, 2012; Inventor: Gerstenberger et al.
3GPP TS 36.213, V10.0.0, 3rd Generation Partnership Project; Technical Specification Group Radio Access Network; Evolved Universal Terrestrial Radio Access (E-UTRA); Physical layer procedures (Release 10) (Dec. 2010).
3GPP 36.212, V10.0.0, 3rd Generation Partnership Project; Technical Specification Group Radio Access Network; Evolved Universal Terrestrial Radio Access (E-UTRA); Multiplexing and channel coding (Release 10) (Dec. 2010).
International Preliminary Report on Patentability and Written Opinion dated Oct. 15, 2013 in International Application No. PCT/SE2011/051228.
International Preliminary Report on Patentability dated Jul. 19, 2013 in PCT Application No. PCT/SE2011/051572 (18 pages).
Research In Motion UK Limited, "DL HARQ Operation During Transmission Mode Change", 3GPP Draft; R2-094287, 3rd Generational Partnership Project (3GPP), Mobile Competence Centre; 650, Route Des Lucioles; F-06921 Sophia-Antipolis Cedex, France, No. Shenzhen, China; 2009-0816, Aug. 16, 2009 (3 pages).
Qualcomm Incorporation, "Soft Buffer Partitioning for CA", 3GPP Draft; R1-110911, 3rd Generation Partnership Project (3GPP), Mobile Competence Centre; 650, Route Des Lucioles; F-06921 Sophia-Antipolis Cedex, France, vol. RAN WG1, No. Taipei, Taiwan; Feb. 21, 2011, Feb. 15, 2011 (11 pages).
3GPP TS 36.306 VI0.0.0; Technical Specification; 3rd Generation Partnership Project; Technical Specification Group Radio Access Network; Evolved Universal Terrestrial Radio Access (E-UTRA); User Equipment (UE) Radio Access Capabilities (Release 10) (Dec. 2010) (17 pages).
International Search Report and Written Opinion issued in Application No. PCT/SE2011/051572 dated Jun. 21, 2012 (13 pages).
3GPP TS 36.213, V10.1.0, 3rd Generation Partnership Project; Technical Specification Group Radio Access Network; Evolved Universal Terrestrial Radio Access (E-UTRA); Physical layer procedures (Release 10) Mar. 2011 (115 pages).
Intellectual Property India, Government of India, First Examination Report, Application No. 2955/KOLNP/2013 (English and Indian Language); dated Sep. 10, 2019, 7 pages.

* cited by examiner

| SB 0 | SB 1 | SB 2 | SB 3 | SB 4 | SB 5 | SB 6 | SB 7 |
|------|------|------|------|------|------|------|------|

Fig. 3

| SB0a | SB1a | SB2a | SB3a | SB4a | SB5a | SB6a | SB7a |
|------|------|------|------|------|------|------|------|
| SB0b | SB1b | SB2b | SB3b | SB4b | SB5b | SB6b | SB7b |

Fig. 4

METHOD AND DEVICE FOR DETERMINING A NUMBER OF MIMO LAYERS

PRIORITY

This application is a continuation, under 35 U.S.C. § 120, of U.S. patent application Ser. No. 14/476,055 which is a Divisional Application of U.S. patent application Ser. No. 13/375,848 which is a U.S. National Stage Filing under 35 U.S.C. § 371 of International Patent Application Serial No. PCT/SE2011/051228, filed Oct. 14, 2011, and entitled "Method and Device for Determining a Number of MIMO Layers" which claims priority to U.S. Provisional Patent Application No. 61/474,938 filed Apr. 13, 2011, all of which are hereby incorporated by reference in their entirety.

TECHNICAL FIELD

Embodiments herein relate generally to a base station and a method in the base station, and to a User Equipment (UE) and a method in the user equipment. More particularly the embodiments herein relate to radio communications, and in particular, to user equipment capabilities.

BACKGROUND

In a typical cellular radio system, wireless terminals communicate via a Radio Access Network (RAN) to one or more Core Networks (CN). The wireless terminals are also known as mobile stations and/or user equipment units, such as mobile telephones, smart phones, cellular telephones, tablet computers and laptops with wireless capability, e.g., mobile termination, and thus may be, for example, portable, pocket-storable, hand-held, computer-comprised, or vehicle-mounted mobile devices which communicate voice and/or data via the radio access network. In the following, the term user equipment is used when referring to the wireless terminal.

The RAN covers a geographical area which is divided into cell areas, with each cell area being served by a Base Station (BS), e.g., a Radio Base Station (RBS), which in some networks is also called NodeB, B node, evolved Node B (eNB) or Base Transceiver Station (BTS). The term base station will be used in the following when referring to any of the above examples. A cell is a geographical area where radio coverage is provided by the radio base station equipment at a base station site. The base stations communicate over the air interface operating on radio frequencies with the user equipment units within range of the base stations.

In some versions, particularly earlier versions, of the radio access network, several base stations are typically connected, e.g., by landlines or microwave, to a Radio Network Controller (RNC). The radio network controller, also sometimes termed a Base Station Controller (BSC), supervises and coordinates various activities of the base station(s) connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a radio access network using wideband code division multiple access for user equipment units.

The Third Generation Partnership Project (3GPP) has undertaken to further evolve the UTRAN and GSM based radio access network technologies.

Long Term Evolution (LTE) is a variant of a 3GPP radio access technology wherein the radio base station nodes are connected directly to a core network, rather than to radio network controller nodes. In LTE the functions of a radio network controller node are generally performed by the radio base station nodes. As such, the radio access network of an LTE system has an essentially "flat" architecture comprising radio base station nodes without reporting to radio network controller nodes. LTE was introduced in 3GPP with release 8. Release 9 and release 10 are later releases of LTE. For example, release 8 may be referred to as e.g. rel-8, release 8, LTE release 8 or 3GPP release 8. The terms "codeword," "layer," "precoding," and "beam forming" have been adapted specifically for LTE to refer to signals and their processing. A codeword represents user data before it is formatted for transmission. The term "layer" is synonymous with stream. For Multiple Input Multiple Output (MIMO), at least two layers must be used. Up to four are allowed. The number of layers is always less than or equal to the number of antennas. Precoding modifies the layer signals before transmission. This may be done for diversity, beam steering, or spatial multiplexing. Beam forming modifies the transmit signals to give the best Carrier to Interference-plus-Noise Ratio (CINR) at the output of the channel.

In LTE, Hybrid Automatic Repeat reQuest (HARQ) with incremental redundancy is used. HARQ is a technique that enables faster recovery from errors in communication networks by storing corrupted packets in the receiving device rather than discarding them. Even if retransmitted packets have errors, a good packet may be derived from the combination of bad ones. Instead of re-transmitting the same portion of the codeword, different redundancy versions are re-transmitted yielding an extra gain over Chase combining.

Ideally, a full buffer is available at the receiver side such that the received soft values for an entire codeword may be stored. However, due to the user equipment complexity and cost concerns, the soft buffer size in a user equipment is limited. For higher rate transmissions, where larger codewords are sent from the transmitter, the user equipment has limited buffer space and is not able to store the complete codeword. The base station may transmit coded bits the user equipment is not able to store, or worse, the user equipment does not know that these are other bits and confuses them with bits it previously has stored.

FIG. 1 depicts simplified a complete codeword and also how many soft bits the user equipment is able to store. FIG. 1 illustrates an encoded transport block and coded bits stored by the user equipment, i.e. soft buffer size. As seen in FIG. 1, the complete codeword comprises systematic bits and parity buts, and the soft buffer size comprises all systematic bits and some of the parity bits of the complete codeword. A parity bit is a bit that is added to a group of source bits to ensure that the number of set bits in the outcome is even or odd. The parity bit may be used to detect single or any other odd number of errors in an output. If the base station and the user equipment have the same understanding about the soft buffer size, then the base station will not transmit coded bits which the user equipment is not able to store. Instead, it only takes those coded bits stored by the user equipment and uses those bits for (re)transmissions. This is depicted by the circular buffer shown in FIG. 2. The term circular buffer refers to an area in a memory which is used to store incoming data. When the buffer is filled, new data is written starting at the beginning of the buffer and overwriting the old data. The codeword, i.e. the systematic bits and the parity bits, are stored in the circular buffer. FIG. 2 illustrates bits used in a first transmission and re-transmissions, derived from the circular buffer. The size of the circular buffer matches the soft buffer size of the user equipment. The complete circle in FIG. 2 corresponds to the soft buffer size and not to the entire codeword. In the first transmission, depending on the code rate, some or all systematic bits, and none or some parity bits are transmitted. In a retransmission the starting position is changed and bits corresponding to another part of the circumference, e.g. another point in the circular buffer, are transmitted.

In LTE release 8 using Frequency-Division Duplexing (FDD), each user equipment has up to 8 HARQ processes per component carrier. Each HARQ process may comprise up to two sub-processes for supporting dual-codeword MIMO transmissions. Release 8 of LTE divides the available soft buffer equally into the configured number of HARQ processes. Each of the divided soft buffers may be used to store soft values of the received codewords. In case of dual-codeword MIMO transmission, the divided soft buffer is further divided equally to store the soft values of the two received codewords.

In 3GPP the soft buffer size allocation is provisioned as below:

The circular buffer $w_k$ for the r-th coded block is generated as follows:

$$w_k = v_k^{(0)} \text{ for } k=0,\ldots,K_\Pi-1$$

$$w_{K_\Pi+2k} = v_k^{(1)} \text{ for } k=0,\ldots,K_\Pi-1$$

$$w_{K_\Pi+2k} = v_k^{(2)} \text{ for } k=0,\ldots,K_\Pi-1$$

where $K_\Pi$ is a constant.

The circular buffer has the length $K_w=3K_\Pi$.

Denote the soft buffer size for the transport block by $N_{IR}$ bits and the soft buffer size for the r-th code block by $N_{cb}$ bits. The size $N_{cb}$ is obtained as follows, where C is the number of code blocks:

$$N_{cb} = \min\left(\left\lfloor \frac{N_{IR}}{C} \right\rfloor, K_w\right)$$

for downlink turbo coded transport channels
$N_{cb}=K_w$ for uplink turbo coded transport channels.
where $N_{IR}$ is equal to:

$$N_{IR} = \left\lfloor \frac{N_{soft}}{K_{MIMO} \cdot \min(M_{DL\_HARQ}, M_{limit})} \right\rfloor$$

where:
$N_{soft}$ is the total number of soft channel bit.
$K_{MIMO}$ is equal to 2 if the user equipment is configured to receive Physical Downlink Shared Channel (PDSCH) transmissions based on transmission modes 3, 4 or 8, 1 otherwise.
$M_{DL\_HARQ}$ is the maximum number of DL HARQ processes.
$M_{limit}$ is a constant equal to 8.

The Soft Buffer (SB) allocation for the single-codeword transmission modes is illustrated in FIG. 3. FIG. 3 illustrates 8 allocated soft buffers, where SB0 illustrates a first soft buffer for a first codeword, SB1 illustrates a second soft buffer for a second codeword, SB2 illustrates a third soft buffer for a third codeword etc. FIG. 3 shows soft buffer allocation in LTE release 8 when the Physical Downlink Shared Channel (PDSCH) transmission mode is other than mode 3, 4 or 8. It may be observed that there is a buffer reserved for each codeword.

The soft buffer allocation for the dual-codeword transmission modes is illustrated in FIG. 4. FIG. 4 illustrates 16 allocated soft buffers, where SB0a illustrates a first buffer for a first codeword, SB0b illustrates a second buffer for a second codeword. SB1a illustrates a third buffer for a third codeword, SB1b illustrates a fourth soft buffer for a fourth codeword etc. The soft buffer applies to a codeword. The codeword is a term used for the coded bits associated with a transport block. FIG. 4 shows soft buffer allocation in release 8 of LTE when the PDSCH transmission mode is mode 3, 4 or 8. The transmission modes will be described in more detail below.

The buffer reserved for each codeword is only half of the previous operating case. The soft buffer limitation problem is particularly acute in dual-codeword MIMO transmission operations. This limitation reduces the effectiveness of soft combining gains from incremental redundancy retransmissions.

Carrier Aggregation.

The release 8 of LTE supports bandwidths up to 20 Mega Hertz (MHz). However, in order to meet the International Mobile Telecommunications-Advanced (IMT-Advanced) requirements, 3GPP initiated work on LTE release 10. One part of LTE release 10 is to support bandwidths larger than 20 MHz. An important requirement for LTE release 10 is to assure backward compatibility with LTE release 8, including spectrum compatibility. As a result, a carrier of LTE release 10, which is wider than 20 MHz, may appear as a number of smaller LTE carriers to a user equipment of LTE release 8. Each such carrier may be referred to as a component carrier or cells. For early LTE release 10 deployments, it may be expected that there will be a smaller number of LTE release 10-capable user equipments compared to many LTE legacy user equipments. Therefore, it is desirable to assure an efficient use of a wide carrier by legacy user equipments, which means that it may be possible to implement carriers where legacy user equipments may be scheduled in al parts of the wideband LTE release 10 carrier. One way to achieve this would be using Carrier Aggregation (CA).

Carrier aggregation implies that a user equipment supporting LTE release 10 may receive multiple component carriers, where the component carriers have, or at least may have, the same structure as a carrier of LTE release 8. Carrier Aggregation is illustrated in FIG. 5. The x-axis of FIG. 5 denotes the width of the spectrum used for the five component carriers and the y-axis defines the energy per frequency unit.

Soft Buffer Operation in Carrier Aggregation.

In LTE each component carrier operates with its own set of HARQ processes. Since the total soft buffer memory needs to be shared among component carriers, the soft buffer size per component carrier may vary depending on the number of configured component carriers and the number of configured MIMO transmission modes for each component carriers. The available soft buffer size for each codeword also depends on how the soft buffer is divided and allocated amongst all codewords.

Multi-Antenna Support in LTE.

Multi-antenna capabilities are included already in release 8 of LTE, and are important enablers for high data rates, improved coverage and capacity. The multiple antennas at transmitters and receivers may be used in different ways. Diversity techniques are used to improve the robustness of the link. Beam-forming techniques may be used to improve the coverage. Spatial multiplexing provides a means to enhance the spectral efficiency of the link and improves the performance of the whole system if property designed. Peak rates may be substantially increased using spatial multiplexing and is ideally be increased proportionally to the minimum number of transmit and receive antennas of the link, provided that the Signal-to-Noise Ratio (SNR) is high enough and that the channel conditions are beneficial. Realistic gains are highly channel dependent, they require a high SNR and beneficial interference situations of the relevant link, but may be substantially improved provided that the SNR is sufficiently high. Examples are low system load scenarios or when the user equipment is close to the cell center.

The downlink in LTE release 8 supports Single-User MIMO (SU-MIMO) spatial multiplexing of up to four layers via codebook based precoding. In addition, transmit diversity modes as well as beamforming with single-layer transmission are supported in the downlink of LTE release 8. In LTE release 9, an enhanced downlink transmission mode is introduced in which the beamforming functionality is extended to also support dual-layer transmission, and in which Multi-User MIMO (MU-MIMO) operation is offered where different layers are transmitted to different users. The uplink multi-antenna support in LTE release 8/9 is limited to user equipment antenna selection, which is optional in all UE categories. The UE categories will be described in more detail below.

A user equipment of LTE release 8 assumes its number of layers based on the minimum of what the base station supports and what the user equipment supports. The user equipment determines how many layers the base station supports by either blindly detecting how many Cell-specific Reference Signal (CRS) antenna ports the base station is transmitting from, or in the case of a HandOver (HO), by receiving the information about the how many antenna ports the target cells supports in the HO-command.

Multi-antenna transmission is an important feature in LTE release 8. LTE supports the following 8 transmission modes (TM):

Mode 1: Single antenna port.
Mode 2: Transmit diversity.
Mode 3: Open-loop spatial multiplexing.
Mode 4: Closed-loop spatial multiplexing.
Mode 5: MU-MIMO.
Mode 6: Closed-loop spatial multiplexing, single layer.
Mode 7: Single antenna port, user equipment specific reference signal.
Mode 8: Single or dual-layer transmission with user equipment specific reference signal.

LTE-Advanced, i.e. LTE release 10, comprises a mode 9, in addition to modes 1-8. Mode 9 is a multilayer transmission mode supporting closed-loop SU-MIMO up to rank 8 and enhanced MU-MIMO support.

UE Category Signaling.

User equipments may be categorized in different user equipment categories, called UE categories or UE classes, which defines the overall performance and capabilities of the user equipment. The user equipment category is from now on referred to as UE category. The UE categories are needed to ensure that the base station may communicate correctly with the user equipment. By letting the base station know the UE category, it is able to determine the performance of the user equipment and communicate with it accordingly.

As the UE category defines the overall performance and the capabilities of the user equipment, it is possible for the base station to communicate using capabilities that it knows the user equipment possesses. Accordingly, the base station will not communicate beyond the performance of the user equipment. Different values of a buffer size are associated with each UE category.

In LTE release 8/9, there are five UE categories, 1-5. LTE release 10 has three additional categories, 6-8.

The definition of UE categories of LTE release 10 builds upon the principles used in LTE release 8/9, where the number of UE categories is limited to avoid fragmentation of user equipment implementation variants in the market. The LTE release 10 UE categories are defined in terms of peak rate, ranging from 10, 50, 100, 150 and 300 Mbps up to about 3 Gbps in the downlink. Different realizations of the peak rates are possible within a UE category. For example, in categories 6 and 7, it is possible to either support two layers of MIMO together with carrier aggregation of 40 MHz, or four layers of MIMO with a single carrier of 20 MHz. Both configurations support up to 300 Mbps. The LTE release 8/9 UE categories are reused, supporting, e.g. aggregation of two component carriers with up to 10 MHz bandwidth each for a user equipment of category 3. It is expected that additional UE categories may be defined in the future. LTE release 10 supports a high-end UE category combining aggregation of five component carriers of 20 MHz each with eight layer MIMO, which supports a total peak data rate of about 3 Gbps for LTE-Advanced. Table 1 below shows UE categories supported in LTE release 10. The left most column comprises the UE categories 1-8. The next column comprises the maximum number of DownLink-Shared CHannel (DL-SCH) transport block bits received within a Transmission Time Interval (TTI). The middle column comprises the maximum number of bits of a DL-SCH transport block received within a TTI. The column to the right of the middle column comprises the total number of soft channel bits. The right most column comprises the maximum number of supported layers for spatial multiplexing in DL. Spatial multiplexing is a transmission technique in MIMO wireless communication to transmit independent and separately encoded data signals from each of the multiple transmit antennas.

TABLE 1

UE categories supported in LTE release 10

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| 1 | 10296 | 10296 | 250368 | 1 |
| 2 | 51024 | 51024 | 1237248 | 2 |
| 3 | 102048 | 75376 | 1237248 | 2 |
| 4 | 150752 | 75376 | 1827072 | 2 |
| 5 | 299552 | 149776 | 3667200 | 4 |
| 6 | 301504 | 149776 (4 layers) 75376 (2 layers) | 3667200 | 2 or 4 |
| 7 | 301504 | 149776 (4 layers) 75376 (2 layers) | 3667200 | 2 or 4 |
| 8 | 2998560 | 299856 | 35982720 | 8 |

The user equipment capability signaling of UE categories is defined in the following way. LTE release 8/9 categories 1-5 are signaled from the user equipment to the base station via the Radio Resource Control (RRC) protocol. The RRC protocol handles the control plane signaling of Layer 3 between the user equipment and the UTRAN. LTE release 10 categories are signaled from the user equipment to the base station in separately via the RRC protocol, using a LTE release 10 part of the RRC protocol. The receiver of the message is the base station, and it also the base station that uses the received information. However, the user equipment is not aware of the release of the base station. So in order to be able to operate in a legacy network, a LTE release 10 user equipment would thus report both a LTE release 8/9 UE category (1-5) using a LTE release 8/9 part of the RRC protocol and a LTE release 10 UE category (6-8) using a LTE release 10 part of the RRC protocol. The LTE release 10 UE category would be understood by a LTE release 10 base station, but not by the LTE release 8/9 base station. In addition, a LTE release 10 user equipment also informs the base station per frequency band combination about the supported number of supported MIMO layers in UpLink (UL) and DownLink (DL), as well as the number of supported aggregated component carriers. This information is only understood by a LTE release 10 base station.

As an example, a LTE release 10 user equipment, e.g., category 6 indicates to a LTE release 10 base station that it supports up 4 MIMO layers in the DownLink (DL). The LTE release 10 user equipment may provide this MIMO layer information in an Information Element (IE) sent in addition to the category values. This information element is understood by a LTE release 10 base station but ignored by a LTE release 8/9 base station. A LTE release 8 base station that supports 4 MIMO layers in DL identifies the user equipment through its LTE release 8/9 category e.g., category 4, and therefore assumes that the user equipment supports only 2 layers of DL MIMO.

Because the user equipment is not aware of the release of the base station, it does not know whether to operate according to an older release, e.g., the LTE release 8/9 category, e.g. category 4, or a newer release, e.g., the LTE release 10 category, e.g. category 6. This has serious consequences as the user equipment operates differently depending on the category. In this example, the user equipment may assume that the base station operates according to 4 layer MIMO in DL, as it detects the Cell-Specific Reference Signal (CRS) pattern according to 4 layer MIMO, and sends feedback to the base station to support 4 layer DL MIMO operation such as a rank indicator greater than 2, Channel Quality Indicator (CQI), and Pre-coding Matrix Index (PMI). But this leads to corrupted UpLink (UL) control signaling as the base station assumes a maximum rank of 2 when decoding the control signaling, according to the LTE release 8/9 category, e.g. category 4, indicated by the user equipment. It may also lead to corrupted UL data if the UL data is multiplexed together with the UL control signaling.

As another example, a LTE release 10 user equipment may support a higher number of DL MIMO layers than what is required by the UE category. If the user equipment operates according to the higher number of DL MIMO layers in a base station that does not operator with this higher number of DL MIMO layers, similar problems arise as described above.

SUMMARY

An object of embodiments herein is therefore to obviate at least one of the above disadvantages and to provide improved communication between a user equipment and a base station in a communications network.

According to a first aspect, the object is achieved by a method in a base station for communicating with a user equipment in the communication network. The base station is configured to communicate with the user equipment according to a selectable of at least two user equipment categories. Based on information about a selected user equipment category, the base station determines a first number of maximum transmission layers supported by the base station. The base station communicates with the user equipment according to up to the first number of maximum transmission layers and according to the selected user equipment category.

According to a second aspect, the object is achieved by a method in a user equipment for communicating with a base station in a communication network. The user equipment is configured to communicate with the base station according to a selectable of at least two user equipment categories. Based on information about the selected user equipment category, the user equipment determines a first number of maximum transmission layers supported by the user equipment. The user equipment communicates with the base station according to up to the first number of maximum transmission layers and according to the selected user equipment category.

According to a third aspect, the object is achieved by a base station for communicating with a user equipment in the communication network. The base station is configured to communicate with the user equipment according to a selectable of at least two user equipment categories. The base station comprises a determining unit which is configured to, based on information about the selected user equipment category, determine a first number of maximum transmission layers supported by the base station. The base station comprises a communicating unit configured to communicate with the user equipment according to up to the first number of maximum transmission layers and according to the selected user equipment category.

According to a fourth aspect, the object is achieved by a user equipment for communicating with a base station in a communication network. The user equipment is configured to communicate with the base station according to a selectable of at least two user equipment categories. The user equipment comprises a determining unit configured to, based on information about the selected user equipment category, determine a first number of maximum transmission layers supported by the user equipment. The user equipment further comprises a communicating unit which is configured to communicate with the base station according to up to the first number of maximum transmission layers and according to the selected user equipment category.

Since the base station and the user equipment have same understanding of the number of maximum supported DL MIMO layers, improved communication between a user equipment and a base station in a communications network is provided.

Embodiments herein afford many advantages, of which a non-exhaustive list of examples follows:

An advantage of the embodiments herein is that they allow a LTE release 10 user equipment to operate in a legacy network. The embodiments herein allow a LTE release 10 user equipment with a number of DL MIMO layers higher than the required value in the UE category to operate in a network.

An further advantage of the embodiments herein is that the base station and the user equipment will have the same understanding of the number of maximum supported DL MIMO layers. The base station may avoid scheduling the user equipment with more DL MIMO layers than what it supports. The user equipment will not report CSI feedback that the base station does not understand. This has two advantages. Firstly, the base station may schedule the correct number of DL MIMO layers in DL, so that user equipment is only scheduled with an amount its current channel supports or what it actually supported by its capabilities. Secondly, in case the CSI feedback is transmitted multiplexed together with data on PUSCH, the data on PUSCH will be possible to decode as the size of the CSI report will be known by the base station.

Another advantage of the embodiments herein is that they provide improved coverage and capacity in the communications network.

A further advantage is that the embodiments herein reduce the risk of corrupted UL control signaling.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating the embodiments and in which:

Figure 3:
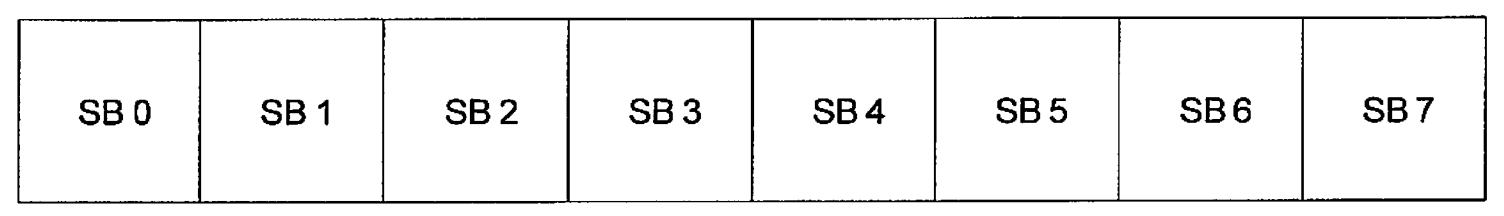

FIG. 3 is a schematic diagram view showing soft buffer allocation in release 8 of LTE when the PDSCH transmission mode is other than mode 3, 4 or 8.

FIG. 4 is a schematic diagram showing soft buffer allocation in release 8 of LTE when the PDSCH transmission mode is mode 3, 4 or 8.

Figure 1:
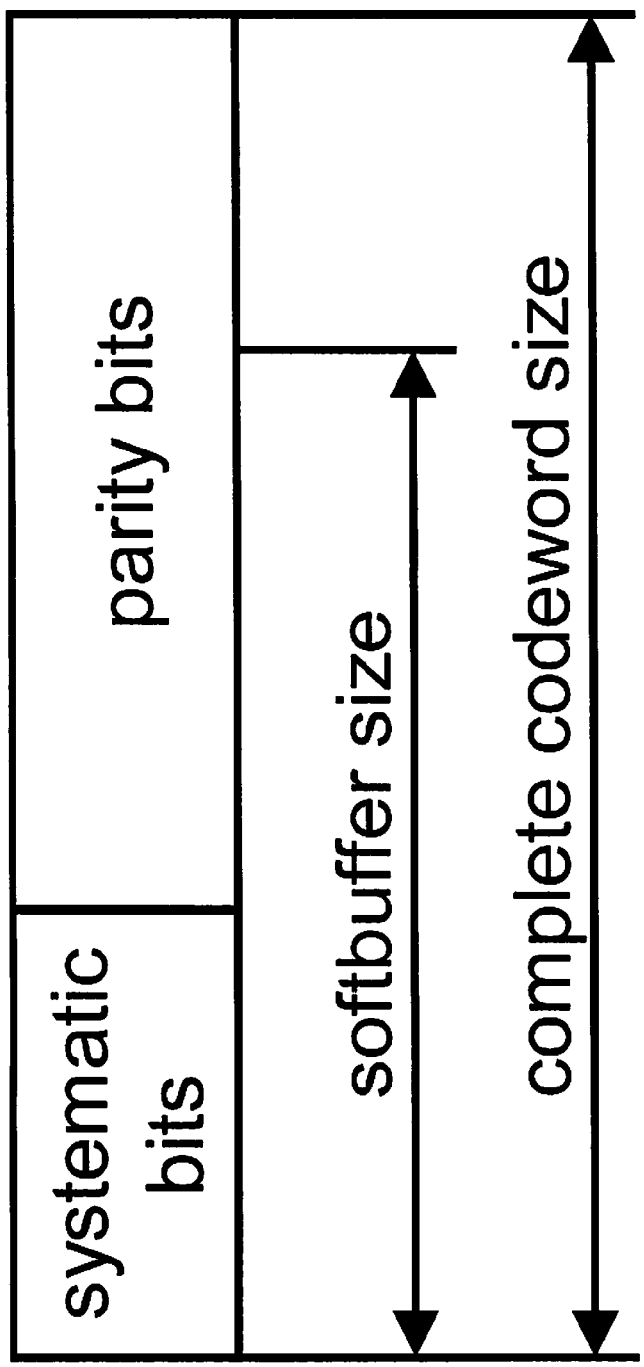
FIG. 1 is a schematic diagram showing an encoded transport block and coded bits stored by a user equipment, i.e. soft buffer size.
Figure 2:
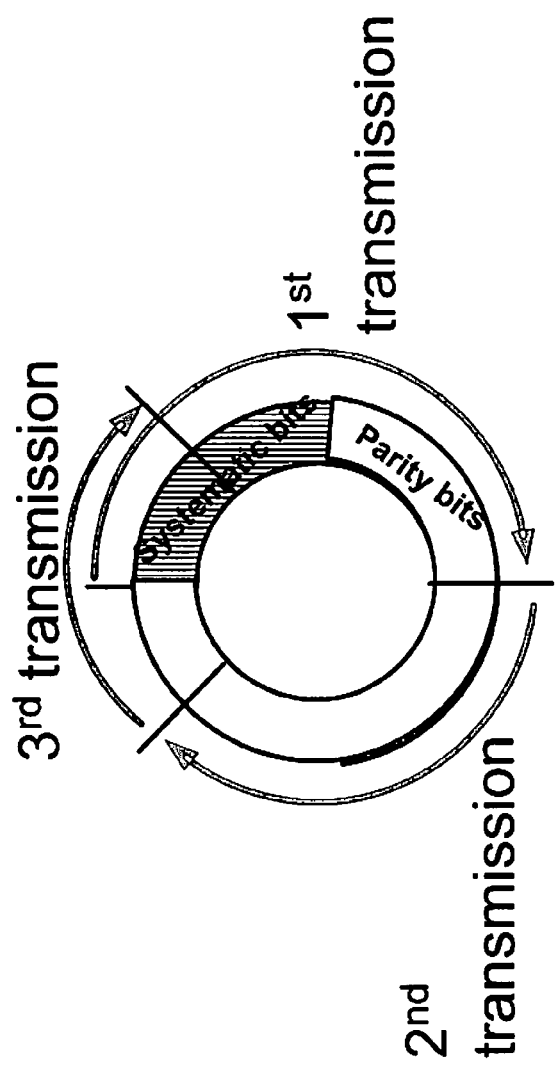
FIG. 2 is a schematic diagram showing that bits used in the first transmission and re-transmissions are derived from a circular buffer.
Figure 5:
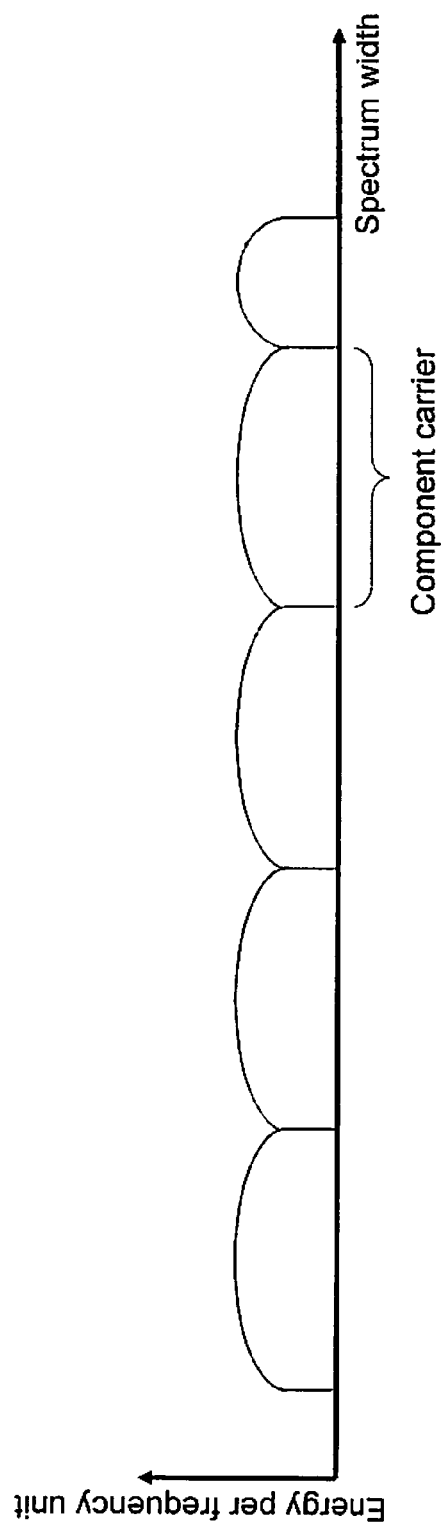
FIG. 5 is a diagrammatic view illustrating carrier aggregation.

The foregoing and other objects, features, and advantages of the embodiments herein will be apparent from the following more particular description of preferred embodiments as illustrated in the accompanying drawings in which reference characters refer to the same parts throughout the various views. The drawings are not necessarily to scale, and the dimensions of certain features may have been exaggerated for the sake of clarity. Emphasis instead being placed upon illustrating the principles of the embodiments herein.

DETAILED DESCRIPTION

Figure 6:
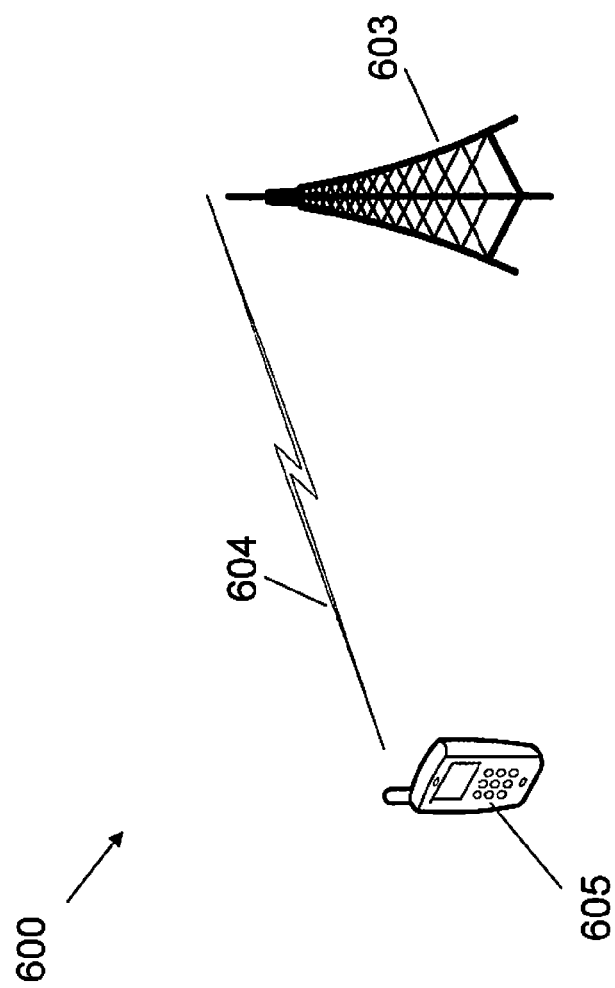
FIG. 6 is a schematic block diagram illustrating embodiments of a communications network.

FIG. 6 depicts a communications network 600 in which embodiments herein may be implemented. The communications network 600 may in some embodiments apply to one or more radio access technologies such as for example LTE, LTE Advanced, WCDMA, GSM, WiMAX, or any other 3GPP radio access technology.

The communications network 600 comprises a base station 603 serving a cell. The base station 603 may be a base station such as a NodeB, an eNodeB, or any other network unit capable to communicate over a radio carrier 604 with a user equipment 606 being present in the cell. The base station 603 may be a LTE release 8/9 or a LTE release 10 base station.

The user equipment 605 may be any suitable communication device or computational device with communication capabilities capable to communicate with a base station over a radio channel, for instance but not limited to mobile phone, tablet computer, smart phone, personal digital assistant (PDA), laptop, MP3 player or portable DVD player, or similar media content devices, digital camera, or even stationary devices such as a PC. A PC may also be connected via a mobile station as the end station of the broadcasted or multicasted media. The user equipment 605 may also be an embedded communication device in e.g. electronic photo frames, cardiac surveillance equipment, intrusion or other surveillance equipment, weather data monitoring systems, vehicle, car or transport communication equipment, etc. The user equipment 605 is referred to as UE in some of the figures. The user equipment 605 may be a LTE release 8/9 or LTE release 10 user equipment.

A user equipment 605 of LTE release 8/9 is of UE categories 1-5. Another type is a user equipment 605 which is of UE category 6-8, as illustrated in Table 1 above. This may be referred to as a LTE release 10 user equipment. In that case, the user equipment 605 always signals two UE categories to the base station 603, independent of which LTE release the base station 603 is. For example, a user equipment 605 of UE category 6 also signals the UE category 5. If the base station 603 is of LTE release 8/9, the base station 603 will only understand that the user equipment 605 is of UE category 5, as the user equipment 605 signaling for of the UE category 6 is done in such way that a base station 603 of an older release does not understand it and simply discards this part of the UE signaling.

The method for communicating in the communications network according to some embodiments will now be described with reference to examples shown in the combined signaling diagrams and flowcharts depicted in FIGS. 7a-d.

Figure 7A:
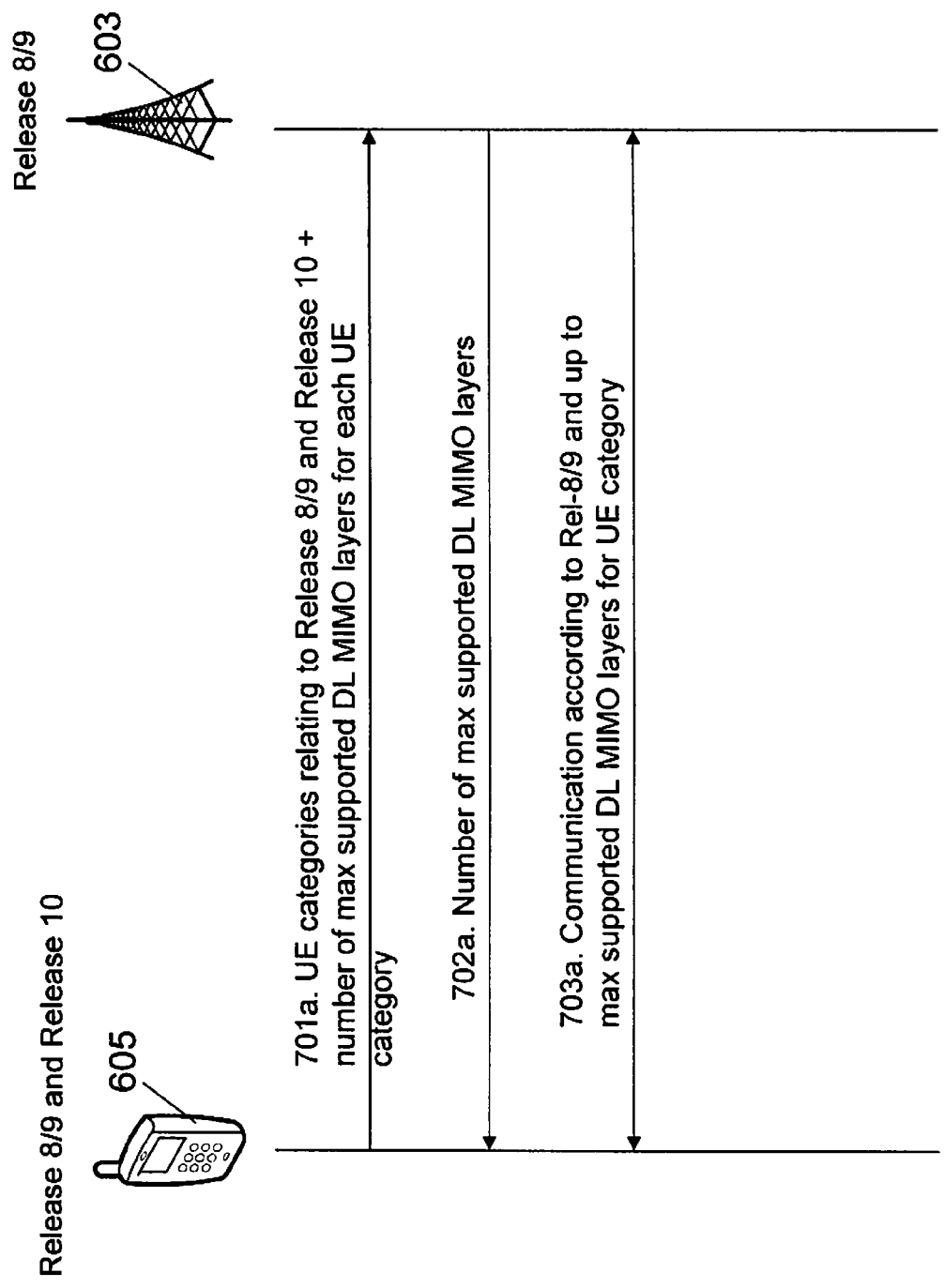
FIG. 7a-d are flowcharts illustrating embodiments of a method.

FIG. 7a illustrates an example of an embodiment where the user equipment 605 is of LTE release 8/9 and LTE release 10. The base station 603 is of LTE release 8/9. As a default, the user equipment 605 assumes that the number of maximum supported DL MIMO layers is the number associated with the LTE release 8/9 UE category. This is because the user equipment 605 does not know if the base station 603 knows that the user equipment 605 supports both LTE release 8/9 and LTE release 10. The LTE release 8/9 base station 603 assumes the number of maximum supported DL MIMO layers as per the required value from its LTE release 8/9 category. The method comprises the following steps, which steps may as well be carried out in another suitable order than described below.

Step 701a

The user equipment 605 signals its capability to act according to at least two different UE categories of different releases, one of which relates to LTE release 8/9 and another relating to LTE release 10 to the base station 603. In addition to information about the UE categories, the user equipment

605 signals information about a number of maximum supported DL MIMO layers for each category. e.g. a first number of maximum transmission layers and a second number of maximum transmission layers.

For example, the first UE category relating to LTE release 8/9 may be 3 and the second UE category relating to LTE release 10 may be category 8. The number of maximum supported DL MIMO layers for category 3 is 2, and the number of maximum supported DL MIMO layers for category 6 is 8, as seen from Table 1 above.

The user equipment 605 may be configured with UE capability parameters with indicates number of maximum DL MIMO layers it may support. This UE capability parameter may be an explicit parameter. As a default, this parameter corresponds to the number of maximum supported DL MIMO layers in the LTE release 8/9 UE category. Using the example described in above, the LTE release 8/9 UE category is 3 and the corresponding number of maximum supported DL MIMO layers is 2.

Step 702a

As mentioned above, the base station 603 is of LTE release 8/9 in this example, and therefore the base station 603 determines a number of maximum supported DL MIMO layers according to its LTE release 8/9 UE category.

The base station 603 signals one or more UE capability parameters to the user equipment 605. The UE capability parameters comprise the determined number of maximum supported DL MIMO layers according to LTE release 8/9.

For example, the base station 603 may be of UE category 4, and the corresponding DL MIMO layers is 2. Thus, the base station 603 signals a maximum of 2 supported DL MIMO layers to the user equipment 605.

Step 703a

The user equipment 605 and the base station 603 communicate according to the LTE release 8/9 UE category together with up to the maximum supported DL MIMO layers for that UE category. For example, the UE category is 5 and the maximum supported DL MIMO layers is 4.

Figure 7B:
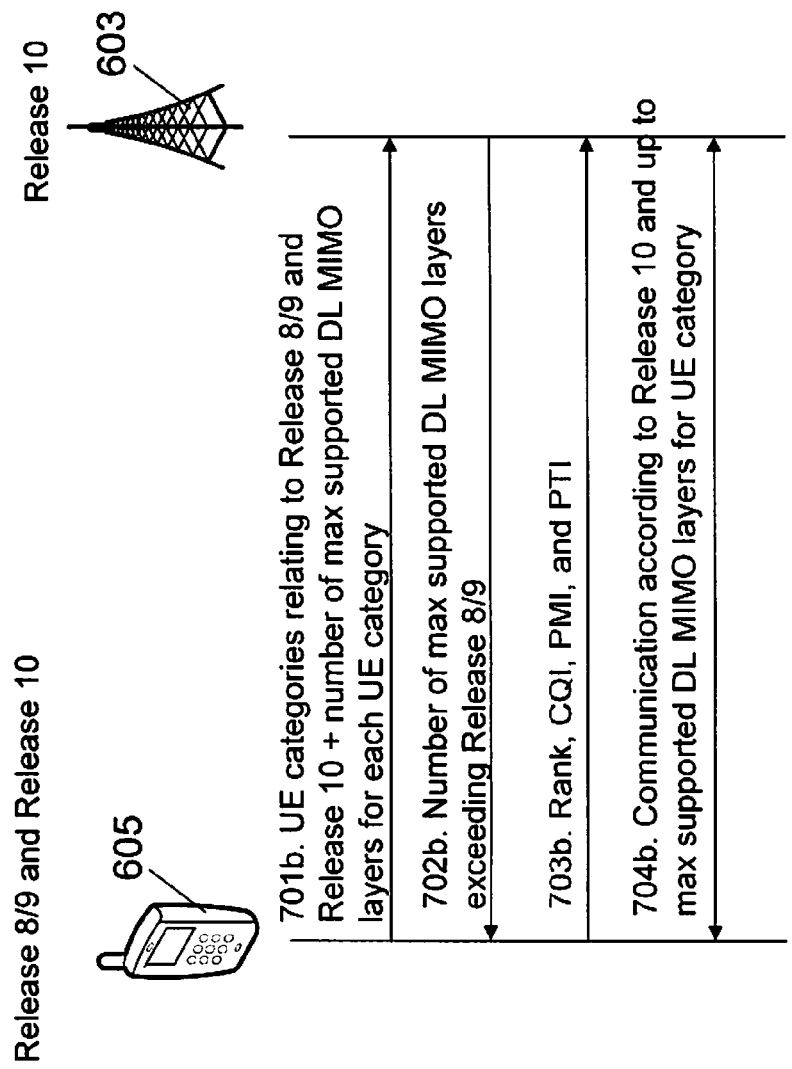

FIG. 7b illustrates an example of an embodiment where the user equipment 605 supports LTE release 8/9 and a LTE release 10. FIG. 7b differs from the example shown in FIG. 7a in that the base station 603 supports LTE release 10 and the figure comprises step 703b. As a default, the user equipment 605 assumes that the number of maximum supported DL MIMO layers is the number associated the UE category associated with LTE release 8/9. For example, if the UE category of LTE release 8/9 is 3, then the associated maximum supported DL MIMO layers is 2, as seen from Table 1 above.

The method comprises the following steps, which steps may as well be carried out in another suitable order than described below.

Step 701b

This step corresponds to step 701a in FIG. 7a.

The user equipment 605 signals its capability to act according to at least two different UE categories of different releases, one of which relates to LTE release 8/9 and another relating to LTE release 10, to the base station 603. In addition to information about the UE categories, the user equipment 605 signals information about a number of maximum supported DL MIMO layers for each category, e.g. a first number of maximum transmission layers and a second number of maximum transmission layers.

For example, the first UE category relating to LTE release 8/9 is 3 and the second UE category relating to LTE release 10 is category 6. The number of maximum supported DL MIMO layers for category 3 is 2, and the number of maximum supported DL MIMO layers for category 6 is 4, as seen from Table 1 above.

The user equipment 605 may be configured with UE capability parameters with indicates the number of maximum DL MIMO layers it may support. This UE capability parameter may be an explicit parameter. As a default, this parameter corresponds to the number of maximum supported DL MIMO layers in the LTE release 8/9 UE category. Using the example described in above, the LTE release 8/9 UE category is 3 and the corresponding number of maximum supported DL MIMO layers is 2.

Step 702b

This step corresponds to step 702a in FIG. 7a.

As mentioned above, the base station 603 supports LTE release 10 UE. The base station 603 supporting LTE release 10 and operates with a number of maximum DL MIMO layers larger than the number related to the respective LTE release 8/9 UE category indicated by the user equipment 605 in step 701b.

For example, the base station 603 may be of UE category 8, which is associated with a number of 8 maximum DL MIMO layers. The number of maximum DL MIMO layers for category 8 supported by the base station 603 is larger than the number of maximum DL MIMO layers for LTE release 10 indicated by the user equipment 605, UE category 6, which is 4. 8>4. Then, the base station 603 signals a DL MIMO layer indication to the user equipment 605 in order to request the user equipment 605 to operate according to a MIMO mode exceeding the number of MIMO layers according to the user equipments 605 LTE release 10 UE category 6, e.g. to operate according to up to 8 numbers of DL MIMO layers.

Step 703b

When the number of maximum DL MIMO layers for the UE category 8 of LTE release 10 is determined to be larger than the number of maximum DL MIMO layers for the UE category 6 of LTE release 10, the user equipment 605 obtains and reports, to the base station 603, rank, CQI, PMI, and Precoding Type Indicator (PTI) according to the largest number of DL MIMO layers indicated by the base station 603 in step 702b. The rank determines how many layers the user equipment 605 assumes it may be scheduled on. The PTI sets which type of PMI and CQI the user equipment 605 reports. The PMI indicates which antenna weights the user equipment 605 assumes is best to apply, i.e. in beamforming. The CQI relates to which code rate the user equipment 605 is able to handle. If the user equipment 605 assumes that it may use more layers the than what the base station 603 thinks, the user equipment 605 may report a too high rank. In that case, the base station 603 is not able to understand the rank and will misunderstand the information as something else. It will neither be able to understand the PTI, CQI and PMI as this information is based on rank the user equipment 605 has reported.

The base station 603 receives the rank, CQI, PMI and PTI and uses the information do link adaption in the DL (not shown in FIG. 7b).

Step 704b

This step corresponds to step 703a in FIG. 7a.

The user equipment 605 and the base station 603 communicate according to the LTE release 10 UE category and according to up to the number of maximum supported DL MIMO layers for that LTE release 10 UE category.

Figure 7C:
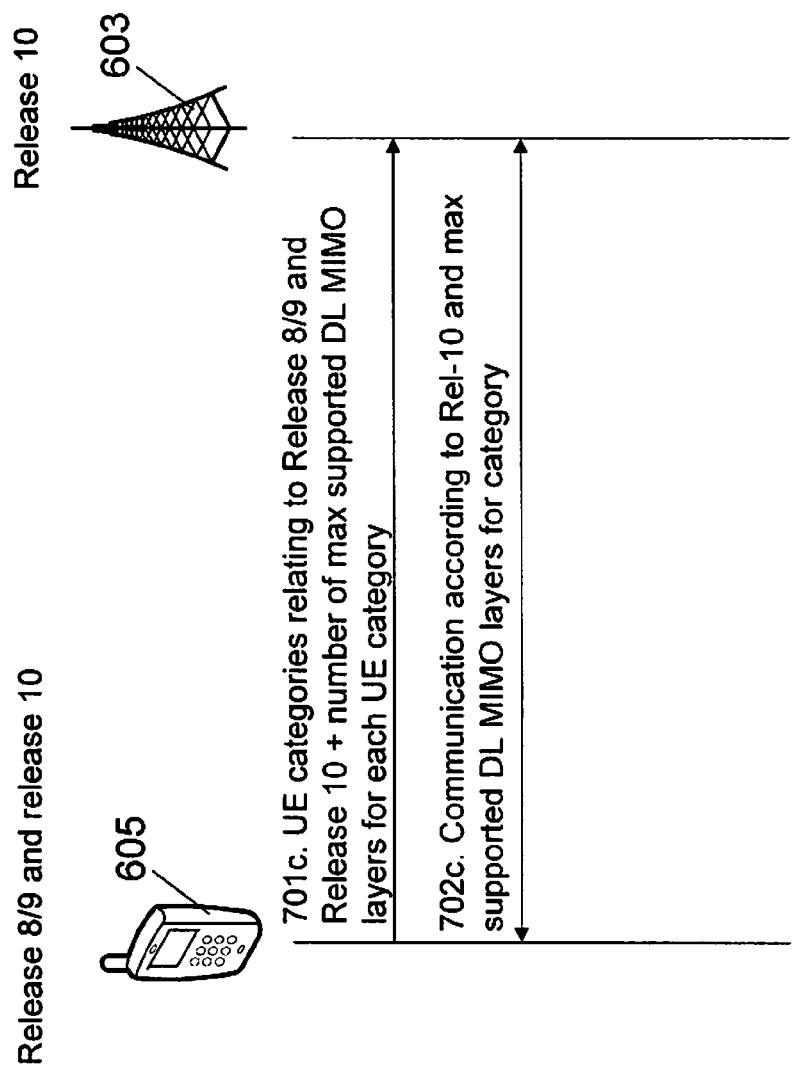

FIG. 7c illustrates an example of an embodiment where the user equipment 605 supports LTE release 8/9 and LTE release 10. The base station 603 is of LTE release 10. The difference between FIGS. 7c and 7b is that the base station 603 operates with a number of DL MIMO layers which is not larger than the required number from the respective UE category, and does therefore not signal a DL MIMO layer indication to the user equipment 605. As a default, the user equipment 605 may assume that the number of maximum supported DL MIMO layers is the same as the number of maximum transmission layers from the UE category according to LTE release 8/9. For a base station 603 of LTE release 10, the number of layers may between 1 to 8 layers, as seen in Table 1. It is an operator choice and a choice of the base station vendor what to build and use in reality. 3GPP only specifies the user equipments 605 default values and not the base stations 603. Simplified, the user equipment 605 is "stupid" and needs to be told what do. The base station 603 may figure out things based on this.

The method comprises the following steps, which steps may as well be carried out in another suitable order than described below.

Step 701c

This step corresponds to step 701a in FIG. 7a and step 701b in FIG. 7b.

The user equipment 605 signals its capability to act according to at least two different UE categories of different releases, one of which relates to LTE release 8/9 and another relating to LTE release 10, to the base station 603. In addition to information about the UE categories, the user equipment 605 signals information about a number of maximum supported DL MIMO layers for each category, e.g. a first number of maximum transmission layers and a second number of maximum transmission layers.

For example, the first UE category relating to LTE release 8/9 may be 3 and the second UE category relating to LTE release 10 may be category 8. The number of maximum supported DL MIMO layers for category 3 is 2, and the number of maximum supported DL MIMO layers for category 6 is 8, as seen from Table 1 above.

The base station 603 operates with a number of DL MIMO layers which is 4 in this example, i.e. UE category 6, which is not larger than the required number from the respective UE category, i.e. 8, and does therefore not signal a DL MIMO layer indication to the user equipment 605.

Step 702c

This step corresponds to step 703a in FIG. 7a and step 704b in FIG. 7b.

The user equipment 605 and the base station 603 communicate using the UE category of LTE release 10 together with up to the number of maximum supported DL MIMO layers for that LTE release 8/9 UE category.

Figure 7D:
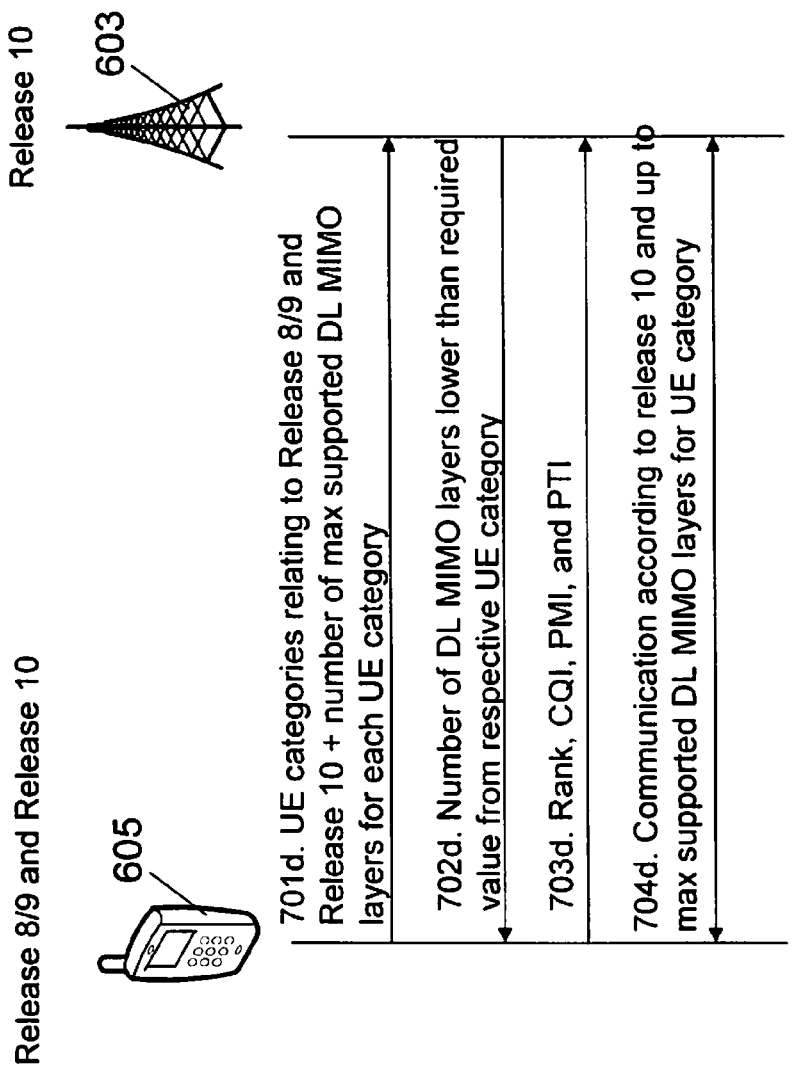

FIG. 7d illustrates an example of an embodiment where the user equipment 605 supports LTE release 8/9 and LTE release 10. The base station 603 supports of LTE release 10, and operates with a number of DL MIMO layers which is not larger than the number associated with the respective UE category. The difference between FIGS. 7d and 7c, is that in the example illustrated in FIG. 7d, the base station 603 signals the DL MIMO layer indication to the user equipment 605 even though the number of DL MIMO layers are lower than the required number from the respective UE category. The indication comprises information about the number of maximum DL MIMO layers used in the base station 603. As a default, the user equipment 605 assumes that the number of maximum supported DL MIMO layers is the required value from the LTE release 8/9 UB category.

The method comprises the following steps, which steps may as well be carried out in another suitable order than described below.

Step 701d

This step corresponds to step 701a in FIG. 7a, step 701b in FIG. 7b and step 701c in FIG. 7c.

The user equipment 605 signals its capability to act according to at least two different UE categories of different releases, one of which relates to LTE release 8/9 and another relating to LTE release 10, to the base station 603. In addition to information about the UE categories, the user equipment 605 signals information about a number of maximum supported DL MIMO layers for each UE category.

For example, the first UE category relating to LTE release 8/9 may be 3 and the second UE category relating to LTE release 10 may be category 8. The number of maximum supported DL MIMO layers for category 3 is 2, and the number of maximum supported DL MIMO layers for category 6 is 8, as seen from Table 1 above.

Step 702d

The base station 603 operates with a number of DL MIMO layers which is 4 in this example, i.e. UE category 6, which is not larger than the required number from the respective UE category, i.e. 8. Even though the number of DL MIMO layers is lower, the base station 603 signals the number of DL MIMO layers that is used in the base station 603, i.e. the number of DL MIMO layers which is lower than the required number from the respective UE category.

Step 703d

This step corresponds to step 703b in FIG. 7b.

When the number of DL MIMO layers is lower than the required number, the user equipment 605 obtains and reports, to the base station 603, the rank, CQI, and PMI according to the number of DL MIMO layers indicated by the base station 603 or according to the required number from the UE category.

Step 704d

This step corresponds to step 703a in FIG. 7a, step 704b in FIG. 7b and step 702c in FIG. 7c.

The user equipment 605 and the base station 603 communicate using the UE category of LTE release 10 together with the number of maximum supported DL MIMO layers for that UE category.

The signaling and restriction of the number of maximum supported DL MIMO layers indication may be implemented in any suitable way. In one embodiment, implicit signaling is used by the base station 603 to the user equipment 605. For example, the indication to the user equipment 605 of which UE category the user equipment 605 has capability to act according to, may either be specifically signaled to the user equipment 605 or broadcasted. In another embodiment, the user equipment 605 assumes a certain default value on its code book subset restriction which corresponds to the number of maximum supported DL MIMO layers in the LTE release 8/9 UE category that the user equipment 605 indicates. The code book subset restriction would restrict the maximum report rank from the user equipment 605 so that it as a default corresponds to the number of maximum DL MIMO layers that its LTE release 8/9 UE category supports. A LTE release base station 603 has the possibility to remove these restrictions if it wants to operate the user equipment 605 according to the number of maximum supported DL MIMO layers of LTE release 10. This achieves a higher throughput to the user equipment 605.

The user equipment 605 may be configured with an explicit parameter indicating the number of maximum DL MIMO layers it is able to support. As a default, this parameter could correspond in the non-limiting example to the number of maximum supported DL MIMO layers in the LTE release 8/9 UE category that the user equipment 605 indicates. A LTE release 10 base station 603 has the possibility to configure a different value for this parameter, if it wants to operate the user equipment 605 according to the user equipments 605 number of maximum supported DL MIMO layers of LTE release 10. This achieves a higher throughput to the user equipment 605.

Figure 8:
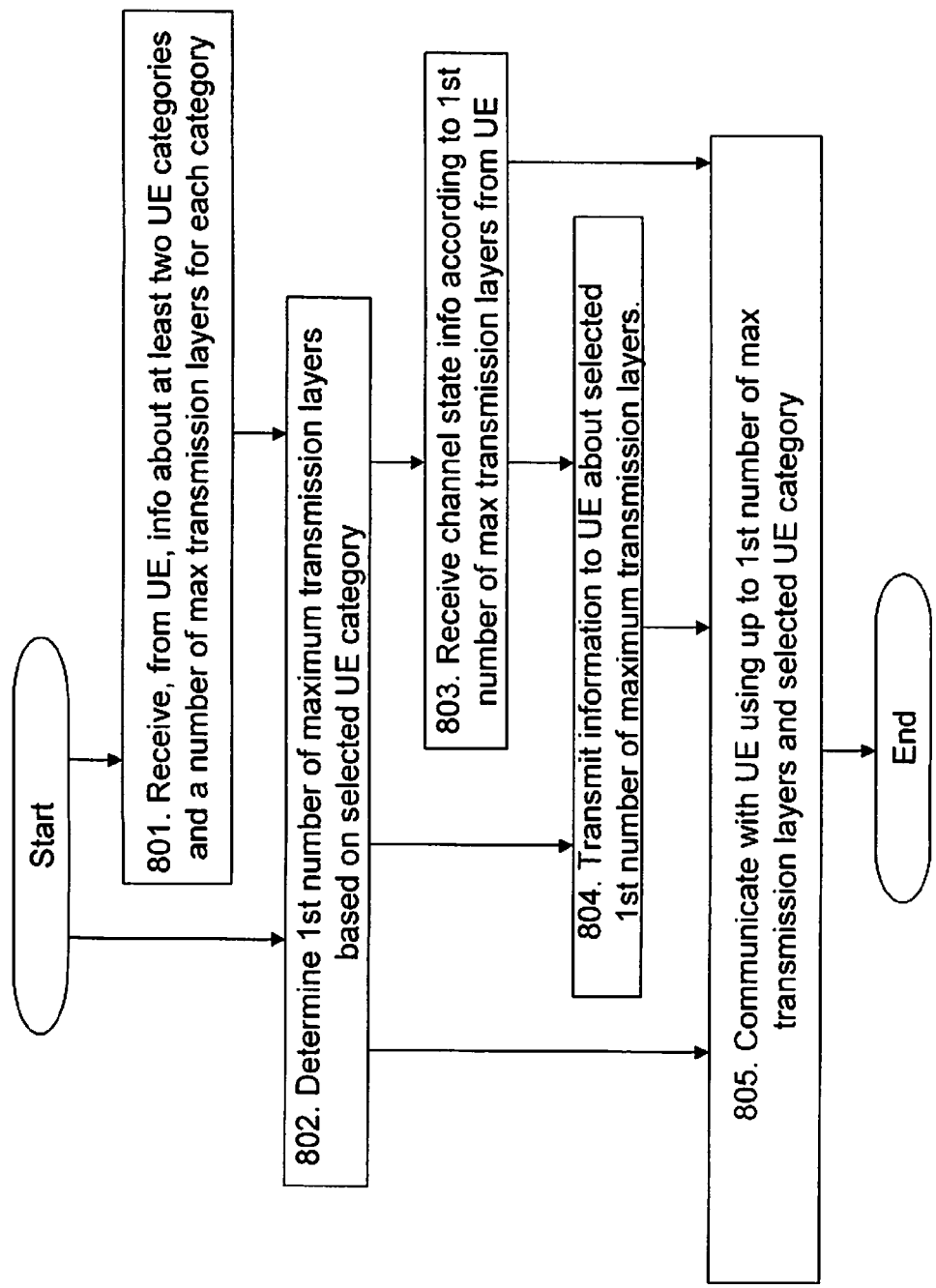
FIG. 8 is a flowchart illustrating embodiments of a method in a base station.

The method described above will now be described seen from the perspective of the base station 603. FIG. 8 is a flowchart describing the present method in the base station 603 for communicating with the user equipment 605 in the communication network 600. The base station 603 is configured to communicate with the user equipment 605 according to a selectable of at least two user equipment categories. The method comprises the following steps, which steps may as well be carried out in another suitable order than described below.

Step 801

This step corresponds to step 701*a* in FIG. 7*a*, step 701*b* in FIG. 7*b*, step 701*c* in FIG. 7*c* and step 701*d* in FIG. 7*d*.

In some embodiments, the base station 603 receives information about the at least two user equipment categories and a number of maximum transmission layers for each user equipment category. The at least two categories may be a first user equipment category and a second user equipment category. The number of maximum transmission layers may be a first number of maximum transmission layers and a second number of maximum transmission layers.

In some embodiments, the selected user equipment category and the first number of maximum transmission layers are associated with release 8/9 of long term evolution, referred to as LTE, and the second number of maximum transmission layers are associated with release 10 of LTE. In some embodiments, the selected user equipment category and the first number of maximum transmission layers are associated with release 10 of LTE, and the second number of maximum transmission layers are associated with release 8/9 of LTE.

Step 802

This step corresponds to step 702*a* in FIG. 7*a*, step 702*b* in FIG. 7*b*, step 702*c* in FIG. 7*c* and step 702*d* in FIG. 7*d*.

Based on information about a selected user equipment category, the base station 603 determines a first number of maximum transmission layers supported by the base station 603.

Step 803

This step corresponds to step 703*b* in FIG. 7*b* and step 703*d* in FIG. 7*d*.

In some embodiments, the base station 603 receives channel state information according to the first number of maximum transmission layers from the user equipment 605. The channel state information comprises information about a state of a radio channel 604 between the user equipment 605 and the base station 603. The channel state information may be rank. CQI, PMI and PTI.

Step 804

This step corresponds to step 702*a* in FIG. 7*a*, step 702*b* in FIG. 7*b* and step 702*d* in FIG. 7*d*.

In some embodiments, the base station 603 transmits information about the first number of maximum transmission layers to the user equipment 605. The first number of maximum transmission layers is supported by the base station 603.

In some embodiments, the first number of maximum transmission layers is transmitted to the user equipment 605 when the first number of maximum transmission layers is larger than the second number of maximum transmission layers.

The base station 603 may transmit the information about the first number of maximum transmission layers to the user equipment 605 via a radio resource control, referred to as RRC, protocol.

Step 805

This step corresponds to step 703*a* in FIG. 7*a*, step 704*b* in FIG. 7*b*, step 702*c* in FIG. 7*c* and step 704*d* in FIG. 7*d*.

The base station communicates with the user equipment 605 according to up to the first number of maximum transmission layers and according to the selected user equipment category.

In some embodiments, the communication with the user equipment 605 using up to the first number of maximum transmission layers and the selected user equipment category is a downlink communication in a direction from the base station 603 to the user equipment 605. This may be referred to as DL MIMO communication.

Figure 9:
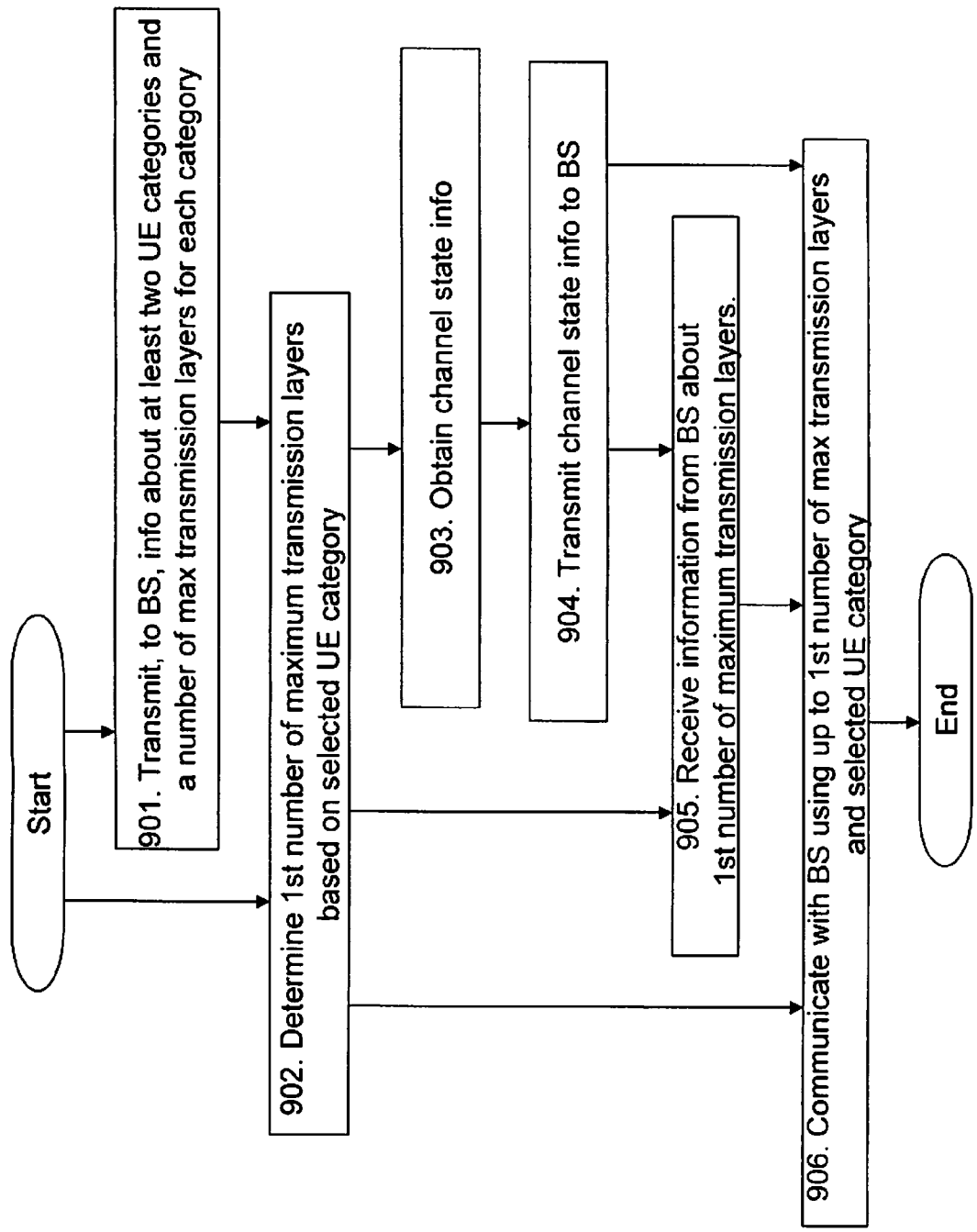
FIG. 9 is a flowchart illustrating embodiments of a method in a user equipment.

The method described above will now be described seen from the perspective of the user equipment 605. FIG. 9 is a flowchart describing the present method in the user equipment 605 for communicating with the base station 603 in the communication network 600. The user equipment 605 is configured to communicate with the base station 603 according to a selectable of at least two user equipment categories. The method comprises the following steps, which steps may as well be carried out in another suitable order than described below.

Step 901

This step corresponds to step 701*a* in FIG. 7*a*, step 701*c* in FIG. 7*c* and step 701*d* in FIG. 7*d*.

In some embodiments, the user equipment 605 transmits, to the base station 603, information about the at least two user equipment categories and a number of maximum transmission layers for each user equipment category.

In some embodiments, the information about the first number of maximum transmission layers is preconfigured in the user equipment 605.

In some embodiments, the selected user equipment category and the first number of maximum transmission layers are associated with release 8/9 of long term evolution, referred to as LTE, and the second number of maximum transmission layers are associated with release 10 of LTE. In some embodiments, the selected user equipment category and the first number of maximum transmission layers are associated with release 10 of LTE and the second number of maximum transmission layers is associated with release 8/9 of LTE.

Step 902

This step corresponds to step 702*a* in FIG. 7*a*, step 702*b* in FIG. 7*b*, step 702*c* in FIG. 7*c* and step 702*d* in FIG. 7*d*.

Based on information about the selected user equipment category, the user equipment 605 determines the first number of maximum transmission layers supported by the user equipment 605.

Step 903

This step corresponds to step 703*b* in FIG. 7*b* and step 703*d* in FIG. 7*d*.

In some embodiments, the user equipment 605 obtains information about a state of a radio channel 604 between the user equipment 605 and the base station 603 and according to the first number of maximum transmission layers.

Step 904

This step corresponds to step 703*b* in FIG. 7*b* and to step 703*d* in FIG. 7*d*.

In some embodiments, the user equipment 605 transmits the obtained channel state information to the base station 603.

Step 905

This step corresponds to step 702a in FIG. 7a, step 702b in FIG. 7b and step 702d in FIG. 7d.

In some embodiments, the user equipment 605 receives information from the base station 603 about the first number of maximum transmission layers.

In some embodiments, the user equipment 605 receives information about the first number of maximum transmission layers when the first number of transmission layers is larger than the second number of maximum transmission layers.

In some embodiments, the information about the first number of maximum transmission layers is received 906 from the base station 603 via a radio resource control, referred to as RRC, protocol.

Step 905

This step corresponds to step 703a in FIG. 7a, step 704b in FIG. 7b, step 702c in FIG. 7c and to step 704d in FIG. 7d.

The user equipment 605 communicates with the base station 603 according to up to the first number of maximum transmission layers and according to the selected user equipment category.

In some embodiments, the communicating with the base station 603 using up to the first number of maximum transmission layers and the selected user equipment category is a downlink communication in a direction from the base station 603 to the user equipment 605.

Figure 10:
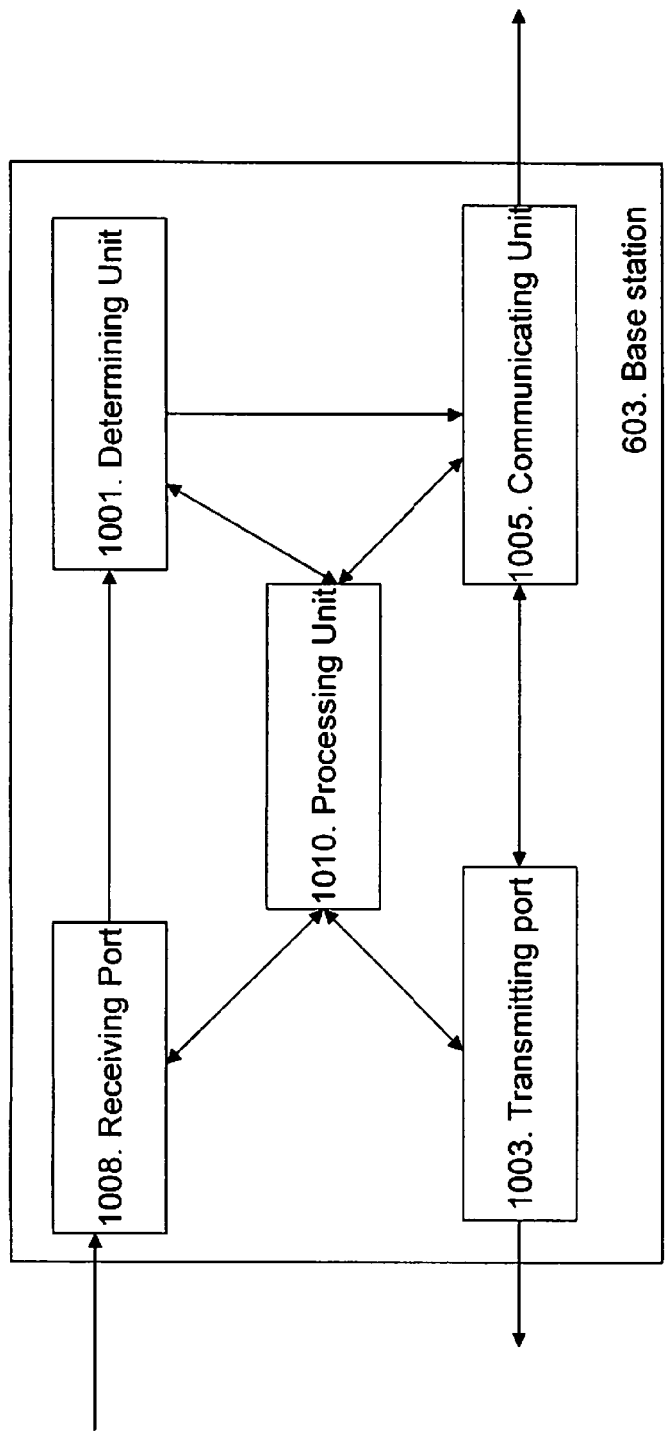
FIG. 10 is a block diagram illustrating embodiments of a base station.

To perform the method steps shown in FIG. 8 for communicating with a user equipment 605 in a communications network 600 the base station 603 comprises an arrangement as shown in FIG. 10. The base station 603 is configured to communicate with the user equipment 605 according to a selectable of at least two user equipment categories.

The base station 603 comprises a determining unit 1001 configured to, based on information about the selected user equipment category, determine a first number of maximum transmission layers supported by the base station 603.

In some embodiments, the base station 603 comprises a transmitting port 1003 which is configured to transmit information to the user equipment 605 about the first number of maximum transmission layers. In some embodiments, the information about the determined selected number of maximum transmission layers is transmitted to the user equipment 605 when the first number of maximum transmission layers is larger than the second number of maximum transmission layers. In some embodiments, the transmitting port 1003 is further configured to transmit the information about the first number of maximum transmission layers to the user equipment 605 via a radio resource control, referred to as RRC, protocol. In some embodiments, the selected user equipment category and the first number of maximum transmission layers are associated with one of release 8/9 of long term evolution, referred to as LTE, and the second number of maximum transmission layers is associated with release 10 of LTE. In some embodiments, the selected user equipment category and first number of maximum transmission layers are associated with one of release 10 of LTE the second number of maximum transmission layers is associated with release 8/9 of LTE.

The base station 603 comprises a communicating unit 1005 configured to communicate with the user equipment 605 according to up to the first number of maximum transmission layers and according to the selected user equipment category. In some embodiments, the communication with the user equipment 605 according to up to the first number of maximum transmission layers and the selected user equipment category is a downlink communication in a direction from the base station 603 to the user equipment 605. In some embodiments, the base station 603 comprises a receiving port 1008 configured to receive, from the user equipment 605, information about the at least two user equipment categories and a number of maximum transmission layers for each user equipment category. In some embodiments, the receiving port 1008 is further configured to receive channel state information according to the first number of maximum transmission layers from the user equipment 605. The channel state information comprises information about a state of a radio channel 604 between the user equipment 605 and the base station 603.

Figure 11:
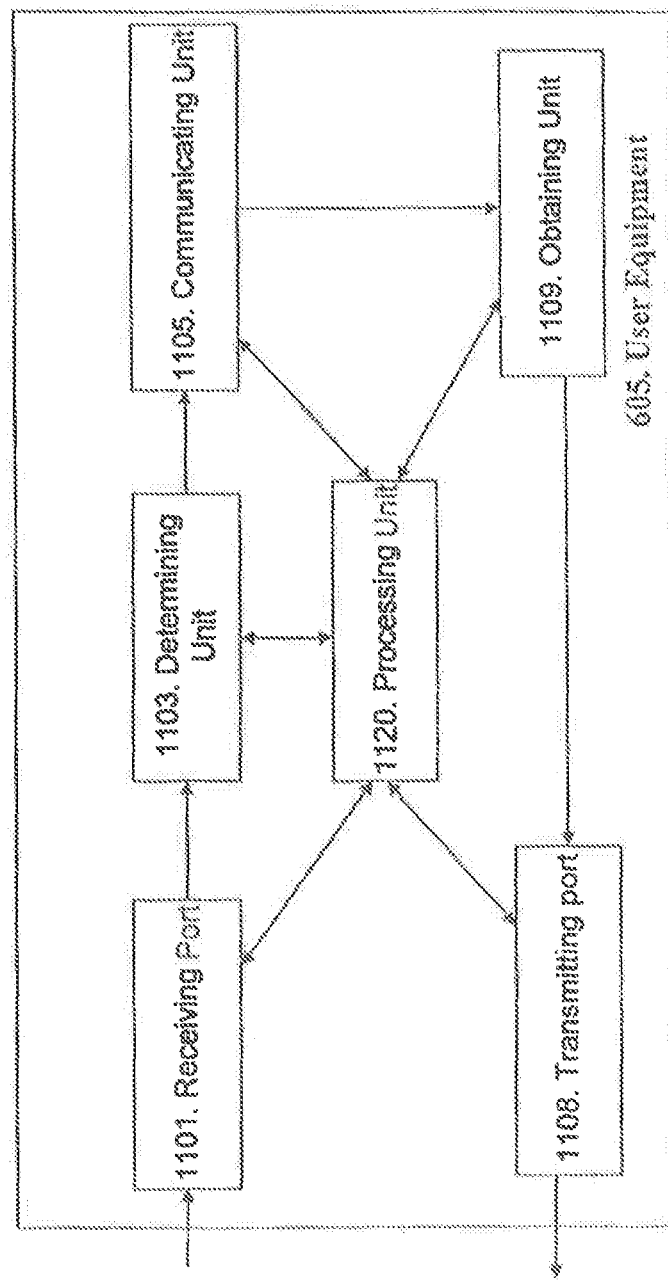
FIG. 11 is a block diagram illustrating embodiment of a user equipment.

To perform the method steps shown in FIG. 9 for communicating with a base station 603 in a communications network 600 the user equipment 605 comprises an arrangement as shown in FIG. 11. The user equipment 605 is configured to communicate with the base station 603 according to a selectable of at least two user equipment categories.

In some embodiments, the user equipment 605 comprises a receiving port 1101 configured to receive information from the base station 603 about the first number of maximum transmission layers. In some embodiments, the receiving port 1101 is further configured to receive the information about the first number of maximum transmission layers from the base station 603 when the first number of transmission layers is larger than the second number of maximum transmission layers. In some embodiments, the information about the first number of maximum transmission layers is received from the base station 603 via a radio resource control, referred to as RRC, protocol. In some embodiments, the information about the first number of maximum transmission layers is preconfigured in the user equipment 605. In some embodiments, the selected user equipment category and the first number of maximum transmission layers are associated with release 8/9 of long term evolution, referred to as LTE, and the second number of maximum transmission layers are associated with release 10 of LTE. In some embodiments, the selected user equipment category and the first number of maximum transmission layers are associated with release 10 of LTE and the second number of maximum transmission layers are associated with release 8/9 of LTE.

The user equipment 605 comprises a determining unit 1103 configured to, based on information about the selected user equipment category, determine a first number of maximum transmission layers supported by the user equipment 605.

The user equipment 605 further comprises a communicating unit 1105 configured to communicate with the base station 603 according to up to the first number of maximum transmission layers and the selected user equipment category. In some embodiments, the communicating with the base station 603 according to up to the first number of maximum transmission layers and the selected user equipment category is a downlink communication in a direction from the base station 603 to the user equipment 605.

In some embodiments, the user equipment 605 comprises an obtaining unit 1109 configured to obtain information about a state of a radio channel 604 between the user equipment 605 and the base station 603 and according to the first number of maximum transmission layers.

In some embodiments, the user equipment 605 comprises a transmitting port 1108 configured to transmit, to the base station 603, information about the at least two user equipment categories and a number of maximum transmission layers for each user equipment category. In some embodiments, the transmitting port 1108 is further configured to transmit the channel state information to the base station 603.

The present mechanism for communication between a user equipment 605 and a base station 603 in a communication network 600 may be implemented through one or more processors, such as a processing unit 1010 in the base station 603 depicted in FIG. 10 and a processing unit 1120 in the user equipment 605 depicted in FIG. 11, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into the user equipment 605 and/or the base station 603. One such carrier may be in the form of a CD ROM disc. It is however feasible with other data carriers such as a memory stick. The computer program code may furthermore be provided as pure program code on a server and downloaded to the user equipment 605 and/or the base station 603 remotely.

Figure 12:
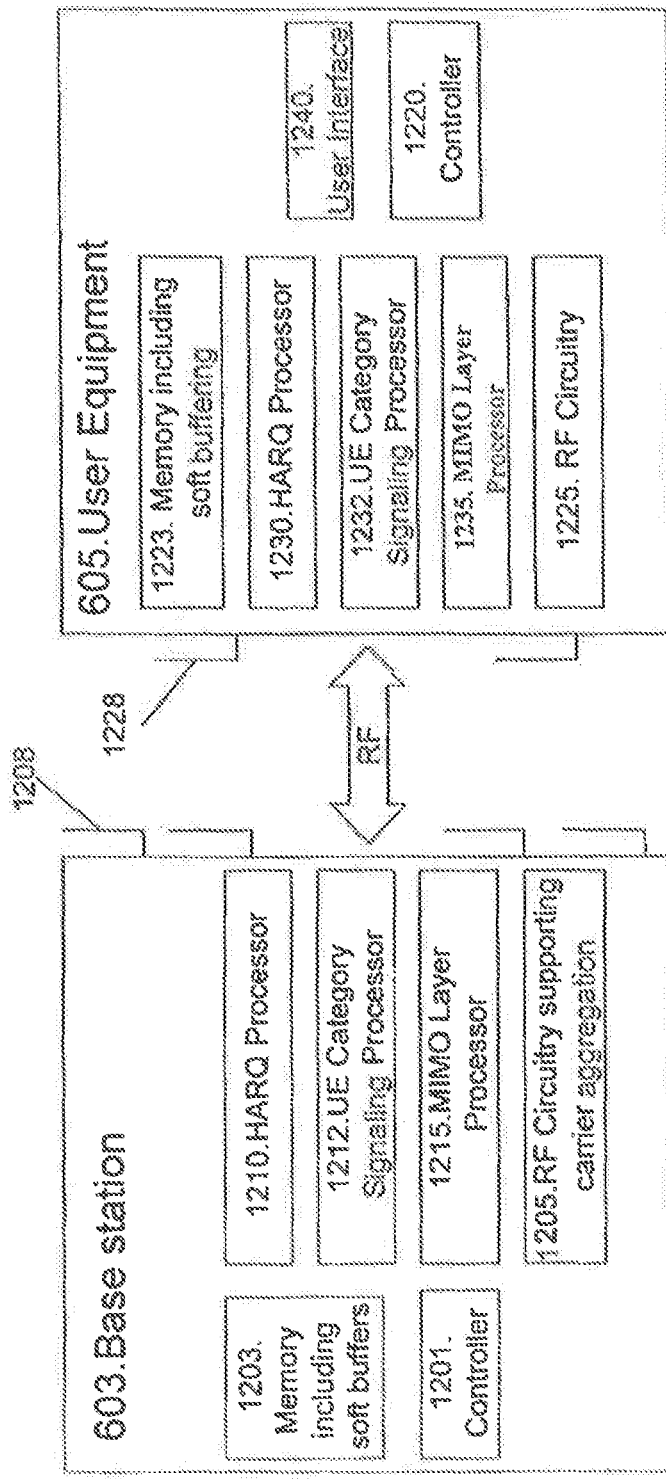
FIG. 12 is a block diagram illustrating embodiments of base station and a user equipment.

FIG. 12 illustrates non-limiting functional block diagrams of a base station 603 and a user equipment 605 for implementing the technology described above including the capability signaling. The base station 603 includes an overall base station controller 1201 coupled to one or more memories 1203 that performs soft buffering. In relation to the user equipment 605, soft buffering may refer to performing rate matching according to the total amount of soft channel bits. In relation to the base station 603, soft buffering may refer to performing rate matching according to the total amount of soft channel bits. Radio Frequency (RF) circuitry 1205 is coupled to multiple antennas 1208 for performing radio transmission and reception for the base station. In FIG. 12, four antennas 1208 are shown as an example. The antennas 1206 in FIG. 12 corresponds to the transmitting port 1003 and the receiving port 1008 in FIG. 10. The example of FIG. 12 shows that carrier aggregation is supported. Multiple processors, corresponding to the determining unit 1001, the processing unit 1010 and the communicating unit 1005 in FIG. 10, are shown for performing corresponding tasks including HARQ processing 1210, UE category signaling processing 1212, and MIMO layer processing 1215.

The user equipment 605 comprises similar processing and memory blocks, and depending on its release, more or less sophistication, bandwidth, and other capabilities. The user equipment 605 comprises an overall user equipment controller 1220 coupled to one or more memories 1223 that performs soft buffering. A RF circuitry 1225 is coupled to multiple antennas 1228 for performing radio transmission and reception for the user equipment 605. In FIG. 12, two antennas 1228 are shown as an example. The antennas 1228 in FIG. 12 corresponds to the transmitting port 1108 and the receiving port 1101 in FIG. 11. Multiple processors, corresponding to the determining unit 1103, the processing unit 1120, the obtaining unit 1109 and the communicating unit 1105 in FIG. 11, are shown for performing corresponding tasks including HARQ processing 1230, UE category signaling processing 1232, and MIMO layer processing 1235. The user equipment 605 further comprises a user interface 1240 for enabling communication with a user of the user equipment 605.

The above description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry. e.g., analog and/or discrete logic gates interconnected to perform a specialized function, ASICs, PLAs, etc. and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware, e.g., digital or analog, circuitry including but not limited to application specific integrated circuit(s) (ASIC(s)) and/or field programmable gate array(s) (FPGA(s)), and, where appropriate, state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The description uses but is not limited to the non-limiting release example introduced above.

Although the description above contains many specifics, they may not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

The invention claimed is:

1. A method in a base station for communicating with a user equipment in the communication network, the user equipment capable of operating according to at least two user equipment categories, the base station being configured to communicate with the user equipment according to a user equipment category selected from the at least two user equipment categories, the method comprising:

receiving, from the user equipment, information about the at least two user equipment categories and at least a first number of maximum downlink (DL) multiple input multiple output (MIMO) transmission layers associated to a first user equipment category, wherein at least a second number of maximum DL MIMO transmission layers is associated with a second user equipment category;
determining, based on the first number of maximum DL MIMO transmission layers associated with the first user equipment category, the second number of maximum DL MIMO transmission layers associated with the second user equipment category, and a number of DL MIMO transmission layers supported by the base station, a supported number of maximum DL MIMO transmission layers corresponding to the first user equipment category, when the base station supports the first user equipment category, and wherein the supported number of maximum DL MIMO transmission layers is not larger than the first number of maximum DL MIMO transmission layers received from the user equipment and greater than or equal to the second number of maximum DL MIMO transmission layers; and
transmitting, to the user equipment via a radio resource control (RRC) protocol, an indication of the supported number of maximum DL MIMO transmission layers.

2. The method according to claim 1, wherein the second user equipment category and the second number of maximum DL MIMO transmission layers are associated with release 8/9 of long term evolution, referred to as LTE, and the first number of maximum DL MIMO transmission layers is associated with release 10 of LTE.

3. The method according to claim 1, further comprising:
communicating with the user equipment up to the supported number of maximum DL MIMO transmission layers;
receiving channel state information according to the supported number of maximum DL MIMO transmission layers from the user equipment, which channel state information comprises information about a state of a radio channel between the user equipment and the base station; and
wherein the communicating with the user equipment up to the supported number of maximum DL MIMO transmission layers is a downlink communication in a direction from the base station to the user equipment.

4. A method in a user equipment for communicating with a base station in a communication network, the user equipment capable of operating according to at least two user equipment categories and configured to communicate with the base station according to a user equipment category selected from the at least two user equipment categories, the method comprising:
transmitting, to the base station, information about the at least two user equipment categories and at least a first number of maximum downlink (DL) multiple input multiple output (MIMO) transmission layers associated to a first user equipment category, wherein at least a second number of maximum DL MIMO transmission layers is associated to a second user equipment category; and
in response to transmitting the information about the at least two user equipment categories to the base station, receiving, from the base station via a radio resource control (RRC) protocol, an indication of a supported number of maximum DL MIMO transmission layers corresponding to the first user equipment category, when the base station supports the first user equipment category, wherein the supported number of maximum DL MIMO transmission layers is not greater than the first number of maximum DL MIMO transmission layers associated to the first user equipment category transmitted to the base station.

5. The method according to claim 4, wherein the second user equipment category and the second number of maximum DL MIMO transmission layers are associated with release 8/9 of long term evolution, referred to as LTE, and the first number of maximum DL MIMO transmission layers is associated with release 10 of LTE.

6. The method according to claim 4, further comprising:
communicating with the base station up to the supported number of maximum DL MIMO transmission layers;
obtaining information about a state of a radio channel between the user equipment and the base station and according to the supported number of maximum DL MIMO transmission layers;
transmitting the channel state information to the base station; and
wherein the communicating with the base station up to the supported number of maximum DL MIMO transmission layers is a downlink communication in a direction from the base station to the user equipment.

7. The method according to claim 4, wherein the information about the second number of maximum DL MIMO transmission layers is preconfigured in the user equipment.

8. A base station for communicating with a user equipment in the communication network, the user equipment capable of operating according to at least two user equipment categories, the base station being configured to communicate with the user equipment according to a user equipment category selected from the at least two user equipment categories, the base station comprising:
a receiving port configured to receive, from the user equipment, information about the at least two user equipment categories and at least a first number of maximum multiple input multiple output (MIMO) transmission layers associated to a first user equipment category, wherein at least a second number of maximum MIMO transmission layers is associated with a second user equipment category;
a processor operable to determine, based on the first number of maximum DL MIMO transmission layers associated with the first user equipment category, the second number of maximum DL MIMO transmission layers associated with the second user equipment category, and a number of DL MIMO transmission layers supported by the base station, a supported number of maximum DL MIMO transmission layers corresponding to the first user equipment category, when the base station supports the first user equipment category, and wherein the supported number of maximum DL MIMO transmission layers is not larger than the first number of maximum DL MIMO transmission layers received from the user equipment and greater than or equal to the second number of maximum DL MIMO transmission layers; and
a transmitting port configured to transmit, to the user equipment via a radio resource control (RRC) protocol, an indication of the supported number of maximum MIMO transmission layers.

9. The base station according to claim 8, wherein the second user equipment category and the second number of maximum MIMO transmission layers are associated with release 8/9 of long term evolution, referred to as LTE, and the first number of maximum MIMO transmission layers is associated with release 10 of LTE.

10. The base station according to claim 8, further comprising:
- a communicating unit configured to communicate with the user equipment up to the supported number of maximum MIMO transmission layers;
- wherein the receiving port is further configured to receive channel state information according to the supported number of maximum MIMO transmission layers from the user equipment, which channel state information comprises information about a state of a radio channel between the user equipment and the base station; and
- wherein the communicating unit is configured to communicate with the user equipment up to the supported number of maximum MIMO transmission layers in a downlink communication, in a direction from the base station to the user equipment.

11. A user equipment for communicating with a base station in a communication network, the user equipment capable of operating according to at least two user equipment categories and configured to communicate with the base station according to user equipment category selected from the at least two user equipment categories, the user equipment comprising:
- a transmitting port configured to transmit, to the base station,
  - information about the at least two user equipment categories and at least a first number of maximum multiple input multiple output (MIMO) transmission layers associated to a first user equipment category, wherein at least a second number of maximum MIMO transmission layers is associated with a second user equipment category; and
- a receiving port configured to receive, from the base station via a radio resource control (RRC) protocol, an indication of a supported number of maximum MIMO transmission layers corresponding to the first user equipment category, when the base station supports the first user equipment category, wherein the supported number of maximum DL MIMO transmission layers is not larger than the first number of maximum DL MIMO transmission layers associated to the first user equipment category transmitted to the base station and wherein the indication of the supported number of maximum MIMO transmission layers is received in response to the transmitting the information about the at least two user equipment categories to the base station.

12. The user equipment according to claim 11, wherein the second user equipment category and the second number of maximum MIMO transmission layers are associated with release 8/9 of long term evolution, referred to as LTE, and the first number of maximum MIMO transmission layers is associated with release 10 of LTE.

13. The user equipment according to claim 11, further comprising:
- a communicating unit configured to communicate with the base station up to the supported number of maximum MIMO transmission layers;
- an obtaining unit configured to obtain information about a state of a radio channel between the user equipment and the base station and according to the supported number of maximum MIMO transmission layers;
- a transmitting port configured to transmit the channel state information to the base station; and
- wherein the communicating unit is configured to communicate with the base station up to the supported number of maximum MIMO transmission layers in a downlink communication, in a direction from the base station to the user equipment.

14. The user equipment according to claim 11, wherein the information about the second number of maximum MIMO transmission layers is preconfigured in the user equipment.

* * * * *

UNITED STATES PATENT AND TRADEMARK OFFICE
CERTIFICATE OF CORRECTION

PATENT NO. : 10,716,116 B2
APPLICATION NO. : 15/493406
DATED : July 14, 2020
INVENTOR(S) : Gerstenberger et al.

It is certified that error appears in the above-identified patent and that said Letters Patent is hereby corrected as shown below:

In the Specification

In Column 1, Line 55, delete "termed a" and insert -- termed as --, therefor.

In Column 2, Line 49, delete "simplified a" and insert -- a simplified --, therefor.

In Column 2, Line 54, delete "buts," and insert -- bits, --, therefor.

In Column 3, Line 31, delete "$w_{K_\Pi+2k}=v_k^{(1)}$ for $k=0,\ldots,K_\Pi-1,$" and insert -- $w_{K_\Pi+2k}=v_k^{(1)}$ for $k=0,\ldots,K_\Pi-1$ --, therefor.

In Column 3, Lines 34-35, delete "$w_{K_\Pi+2k}=v_k^{(2)}$ for $k=0,\ldots,K_\Pi-1,$" and insert -- $w_{K_\Pi+2k}=v_k^{(2)}$ for $k=0,\ldots,K_\Pi-1$ --, therefor.

In Column 3, Line 38, delete "$N_{ch}$" and insert -- $N_{cb}$ --, therefor.

In Column 3, Line 39, delete "$N_{ch}$" and insert -- $N_{cb}$ --, therefor.

In Column 3, Line 46, delete "channels" and insert -- channels, --, therefor.

In Column 3, Line 47, delete "channels." and insert -- channels, --, therefor.

In Column 4, Line 9, delete "codeword." and insert -- codeword, --, therefor.

In Column 4, Line 41, delete "al parts" and insert -- all parts --, therefor.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*

In Column 5, Line 4, delete "property" and insert -- properly --, therefor.

In Column 7, Line 5, delete "it also" and insert -- it is also --, therefor.

In Column 7, Line 23, delete "category 6" and insert -- category 6, --, therefor.

In Column 8, Line 64, delete "An further" and insert -- A further --, therefor.

In Column 9, Line 42, delete "FIG. 7a-d" and insert -- FIGS. 7a-d --, therefor.

In Column 10, Line 2, delete "LTE." and insert -- LTE, --, therefor.

In Column 10, Line 9, delete "user equipment 606" and insert -- user equipment 605 --, therefor.

In Column 11, Line 12, delete "with" and insert -- which --, therefor.

In Column 12, Line 5, delete "with" and insert -- which --, therefor.

In Column 12, Line 49, delete "the than" and insert -- than --, therefor.

In Column 13, Line 10, delete "may between" and insert -- may be between --, therefor.

In Column 13, Line 10, delete "what do." and insert -- what to do. --, therefor.

In Column 13, Line 64, delete "UB" and insert -- UE --, therefor.

In Column 14, Line 30, delete "rank." and insert -- rank, --, therefor.

In Column 14, Line 57, delete "release" and insert -- release 10 --, therefor.

In Column 15, Line 54, delete "rank." and insert -- rank, --, therefor.

In Column 17, Line 16, delete "Step 905" and insert -- Step 906 --, therefor.

In Column 20, Line 8, delete "circuitry." and insert -- circuitry, --, therefor.